Figure 1:
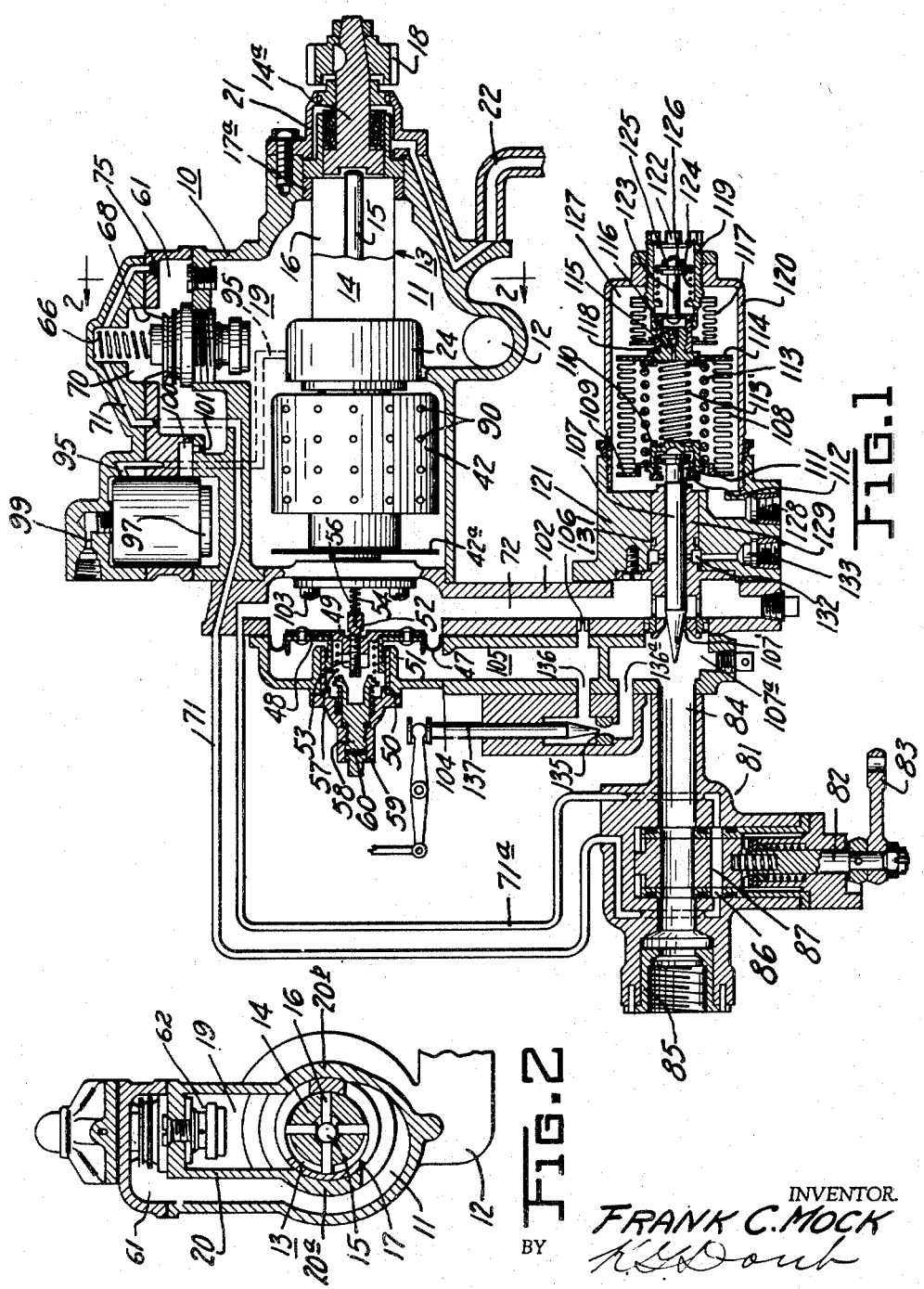

Nov. 28, 1950  F. C. MOCK  2,531,780
FUEL FEEDING SYSTEM FOR ENGINES
Filed April 2, 1945  9 Sheets-Sheet 1

INVENTOR.
FRANK C. MOCK
BY
ATTORNEY

Nov. 28, 1950 F. C. MOCK 2,531,780
FUEL FEEDING SYSTEM FOR ENGINES
Filed April 2, 1945 9 Sheets-Sheet 3

INVENTOR.
FRANK C. MOCK
BY
ATTORNEY

Nov. 28, 1950 — F. C. MOCK — 2,531,780
FUEL FEEDING SYSTEM FOR ENGINES
Filed April 2, 1945 — 9 Sheets-Sheet 4
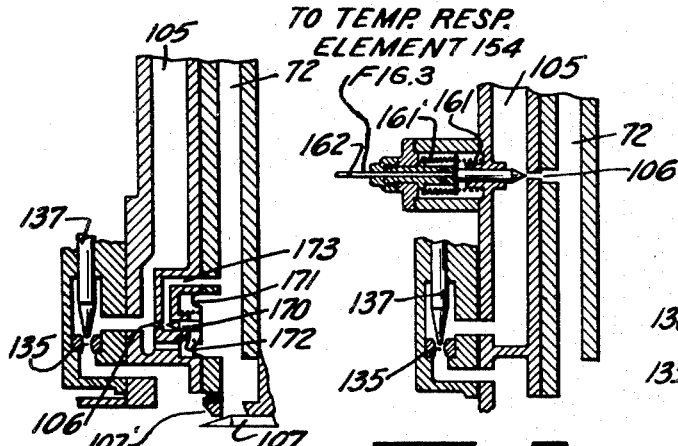
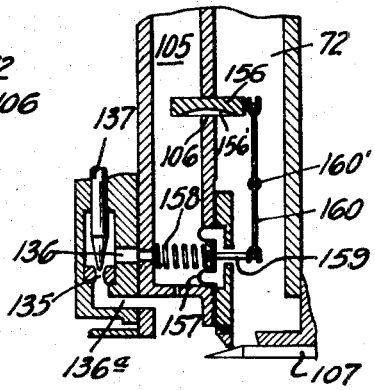
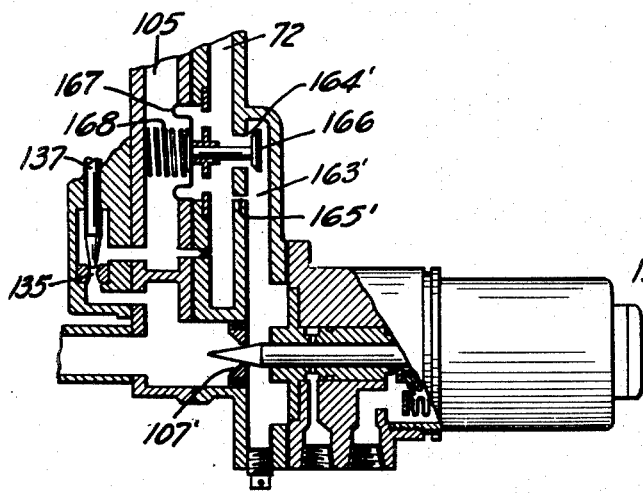
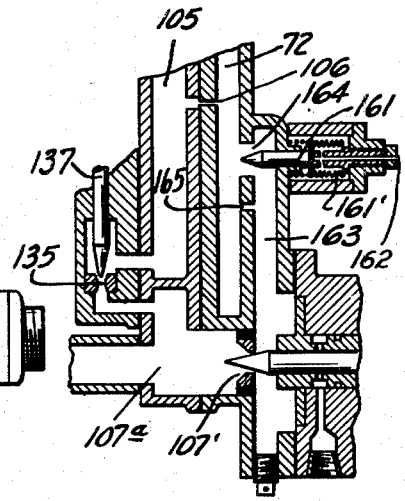
INVENTOR.
FRANK C. MOCK
BY
ATTORNEY

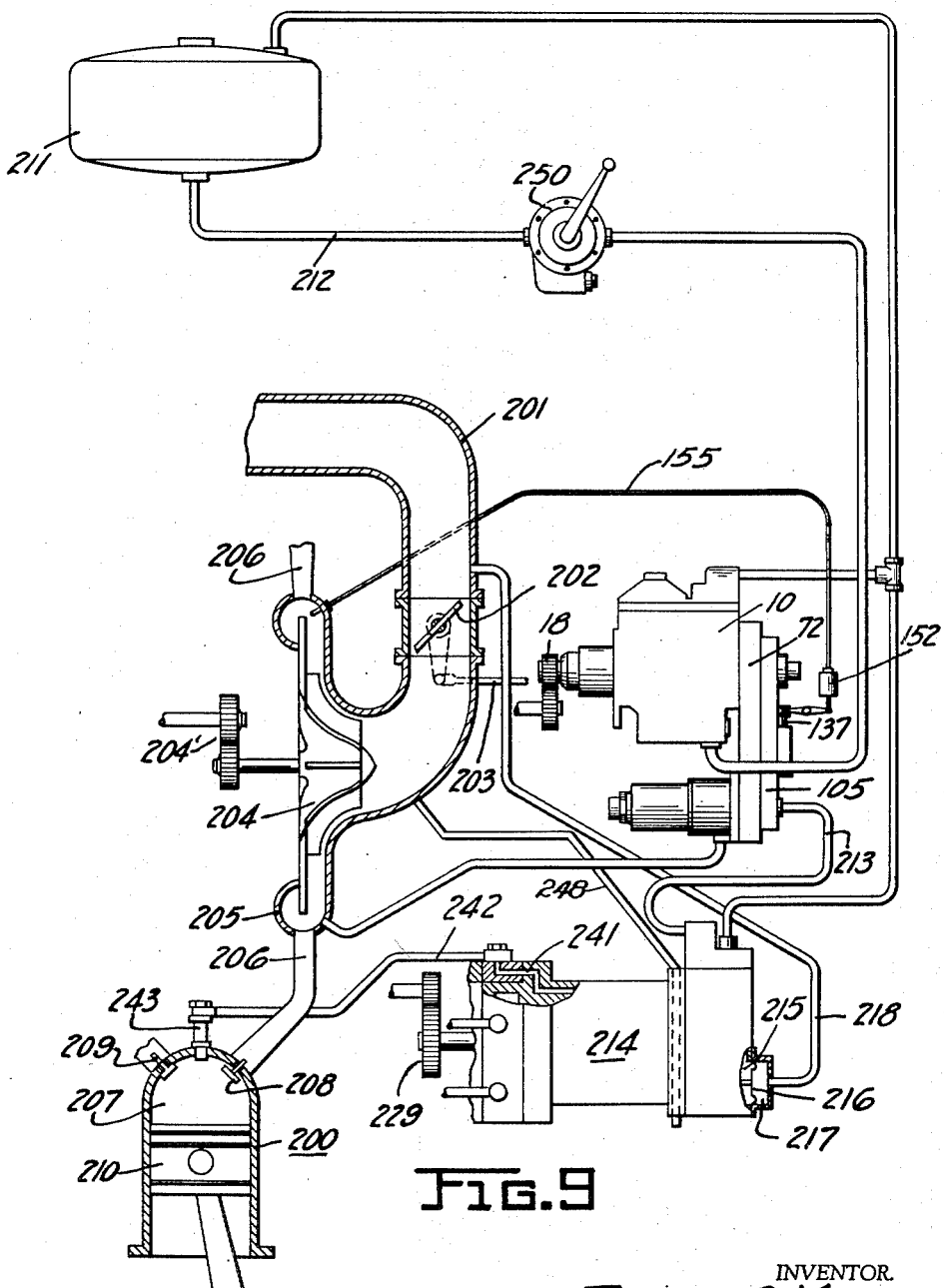

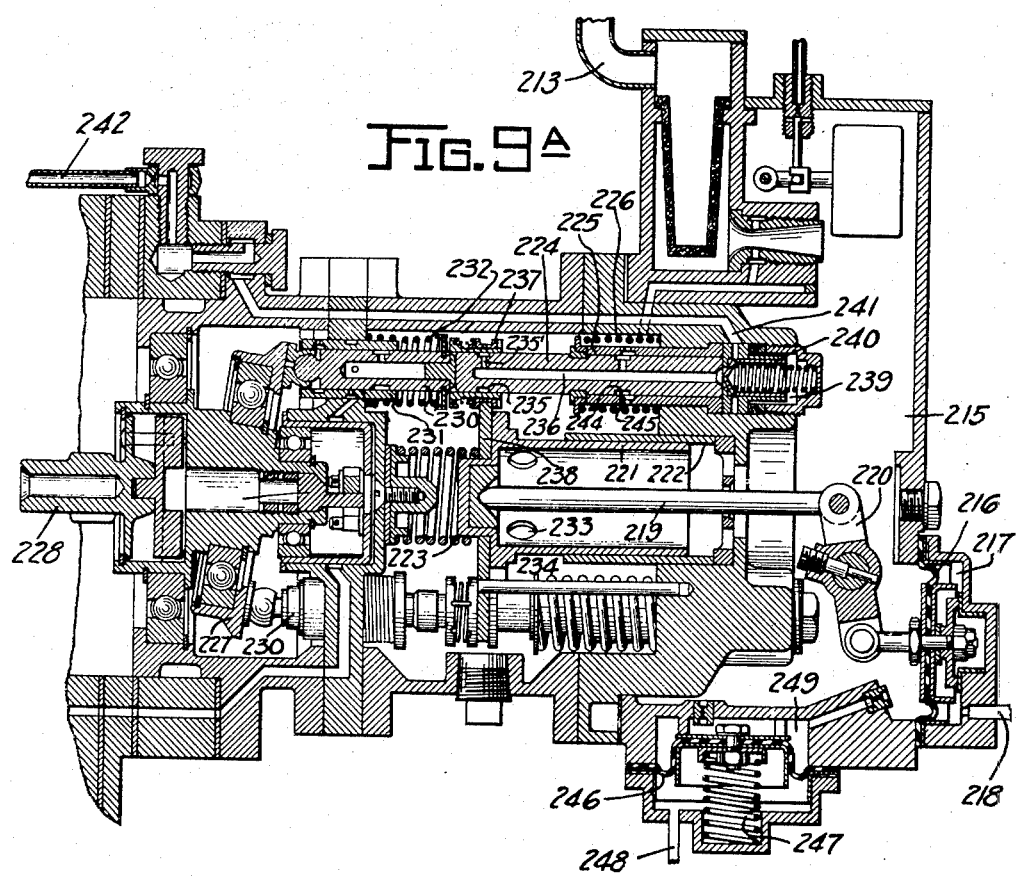
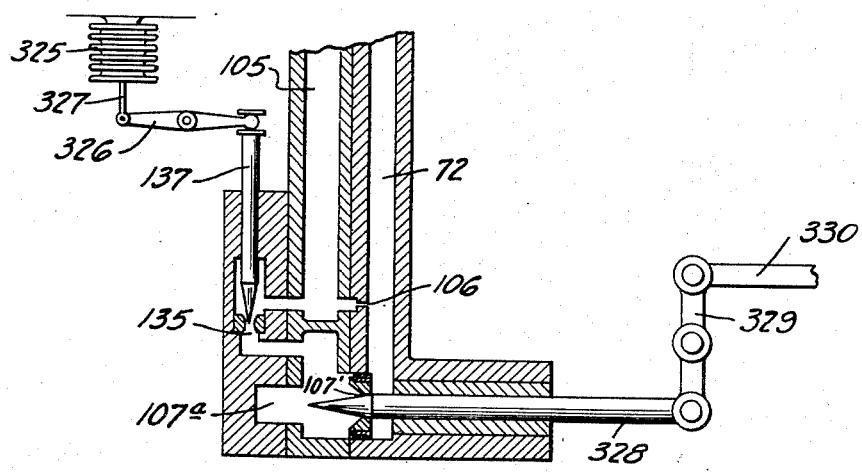

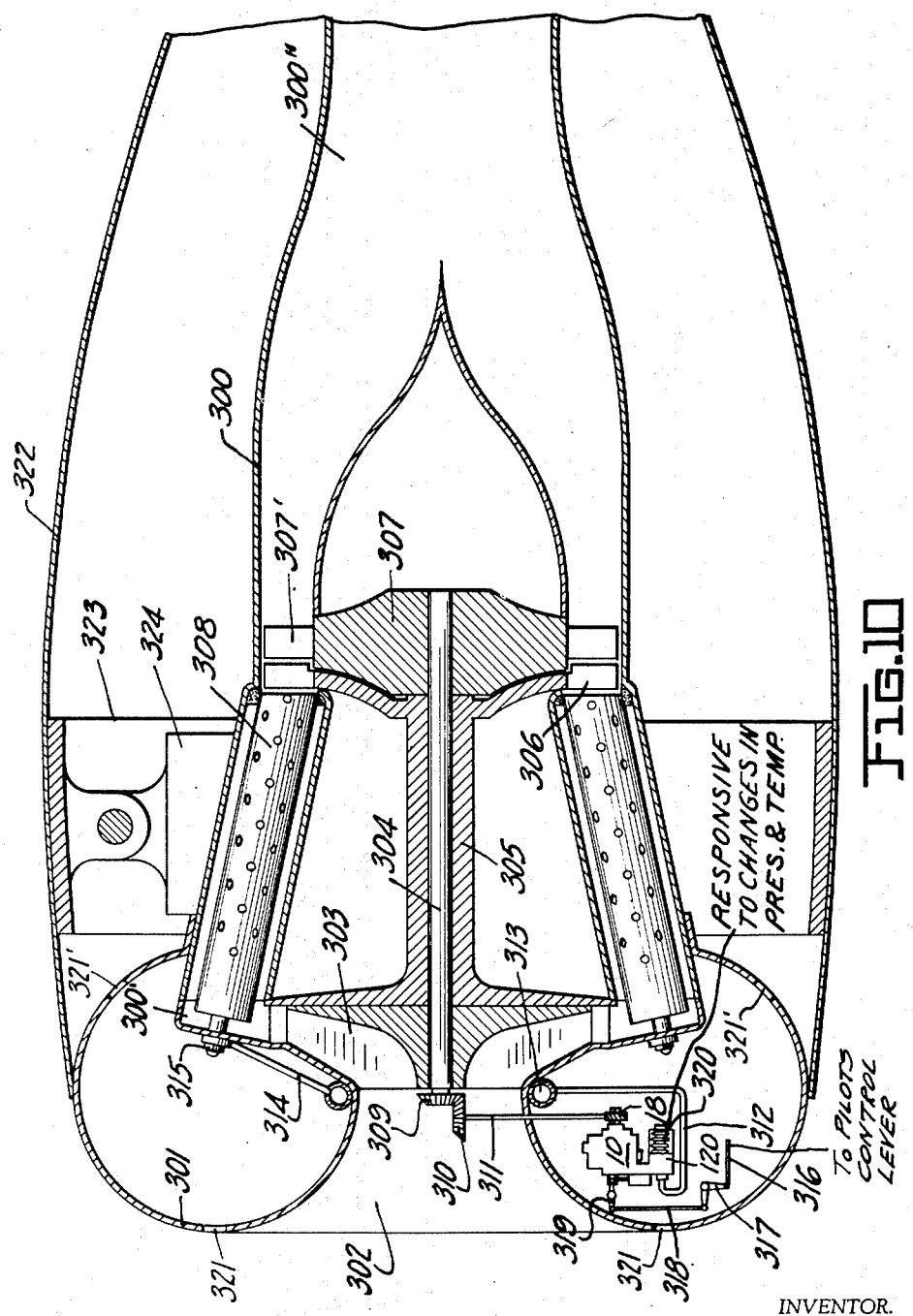

Nov. 28, 1950   F. C. MOCK   2,531,780
FUEL FEEDING SYSTEM FOR ENGINES
Filed April 2, 1945   9 Sheets-Sheet 8

INVENTOR.
FRANK C. MOCK
BY

Patented Nov. 28, 1950

2,531,780

UNITED STATES PATENT OFFICE 2,531,780

FUEL FEEDING SYSTEM FOR ENGINES

Frank C. Mock, South Bend, Ind., assignor to Bendix Aviation Corporation, South Bend, Ind., a corporation of Delaware Application April 2, 1945, Serial No. 586,223

40 Claims. (Cl. 60—41)

This invention relates to fuel-feeding devices for power plants such as internal-combustion engines, gas turbines, jet propulsion engines and the like; it is primarily concerned with, but not restricted to, improvements in fuel-feeding or charge-forming devices of that type wherein the fuel supplied to a power plant or engine is measured or metered on the basis of engine speed modified by one or more operating functions or characteristics indicative of mass air flow to the engine or air consumption. Such a device may utilize a pressure-type fuel pump and a fuel-inlet valve controlled by a speed-responsive element such as a centrifugal governor rotating in synchronism with the engine and whose thrust is opposed by a metering head diaphragm. Since the governor thrust is proportional to R. P. M. squared, the metering head is also proportional to R. P. M. squared; and assuming a fixed metering jet, fuel flow therethrough will be proportional to engine speed for a given engine condition. If now the jet is controlled by a needle movable in relation to some operating characteristic indicative of mass rate of air flow to the engine or weight of air consumed per engine revolution, a relatively accurate fuel/air ratio may be expected throughout the power range.

While the theory of operation is fundamentally sound, difficulty has heretofore been experienced in accurately regulating metering as a function of mass air flow in view of the wide ranges of pressures and temperatures encountered; in adapting the device to power plants of different types and operating characteristics; in avoiding vapor lock or pressure effects; in properly regulating fuel flow over a wide range of operating conditions; and in solving other problems incidental to a practical and efficient working device.

An object of the invention, therefore, is to provide a fuel-feeding or charge-forming device which is readily adaptable to different types of power plants or engines, such as internal combustion engines or gas turbines or jet propulsion engines, wherein power is developed by burning a mixture of combustible fluids, usually liquid fuel and air.

Another object is to improve the fuel-metering characteristics and render more practical fuel-feeding devices of the rotary pump type.

Figure 2:
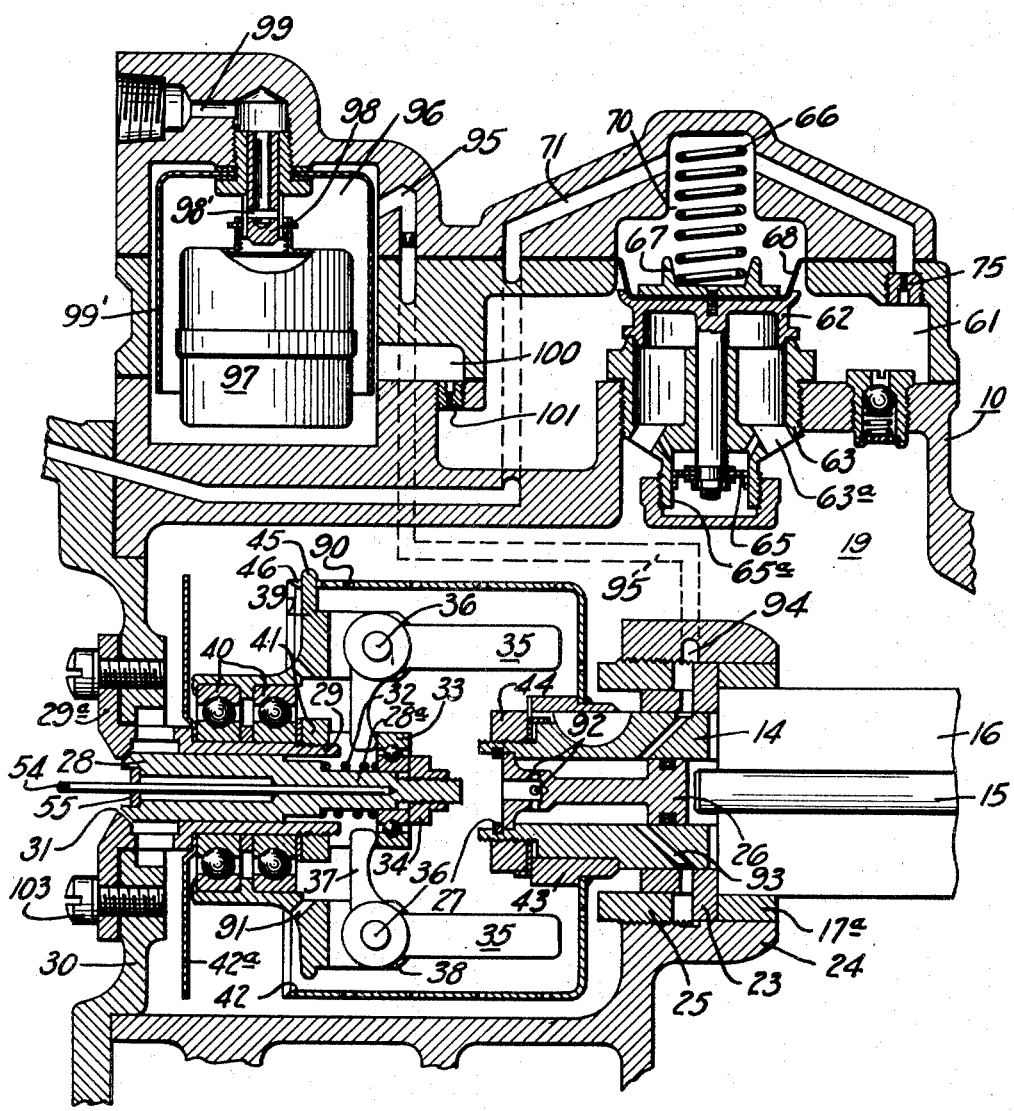
Figure 3:
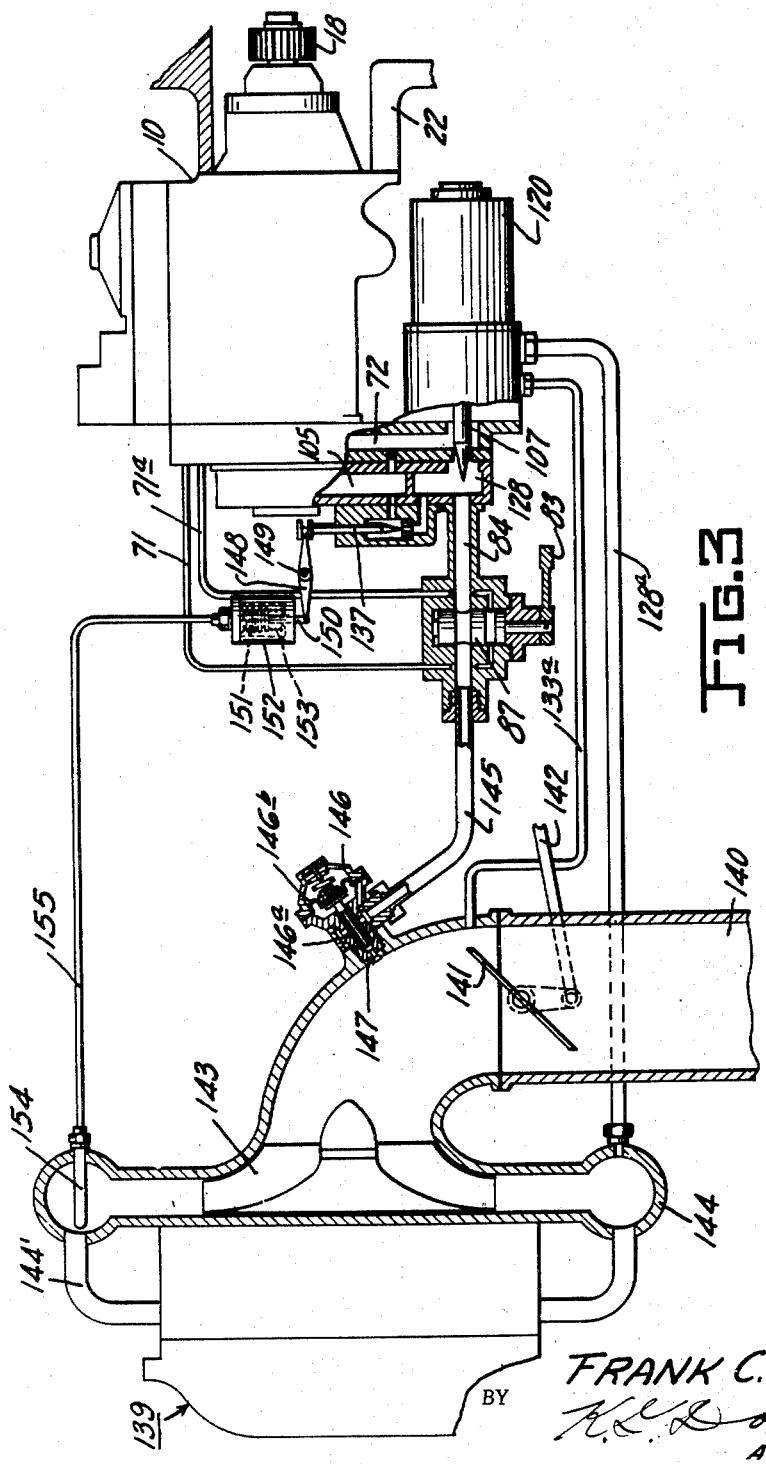
Figure 11:
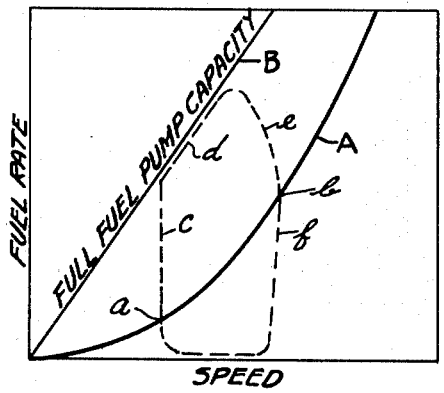
Figure 12:
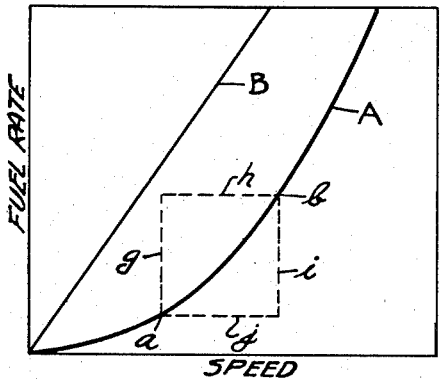
Figure 13:
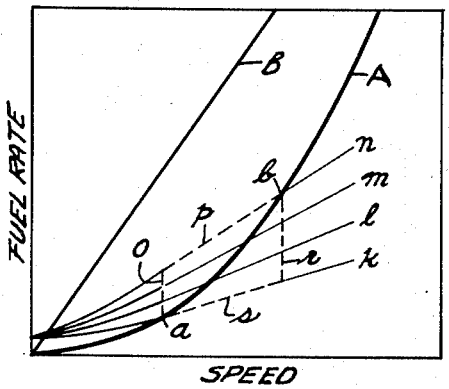
Figure 15:
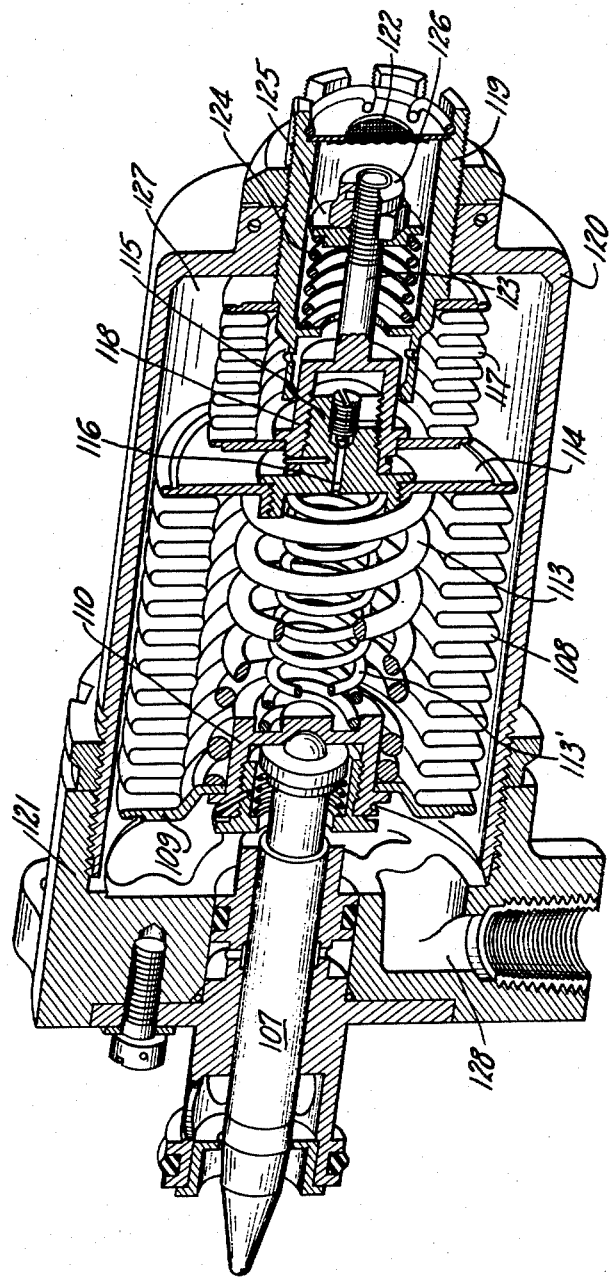

Further objects include:

The provision of an improved metering control system for rotary fuel metering pumps;

To provide more accurate temperature compensation for fuel-feeding devices of the type specified;

To improve the speed governor and valve assembly;

To improve the manifold-back-pressure bellows assembly;

To provide a simplified overspeed control;

And to bring about other improvements and advantages which will become apparent in view of the following description taken in conjunction with the drawings, wherein:

Figure 1 is a schematic diagram of a fuel-feeding device in accordance with the invention;

Figure 1a, an enlarged section of part of Figure 1;

Figure 2, a section taken on line 2—2, Figure 1;

Figure 3, a diagram in broken essential elevation showing the device arranged to supply fuel under pressure to the air-intake conduit of an aircraft internal combustion engine;

Figures 4 to 8, inclusive, fragmentary sectional views showing modified arrangements of the metering head control section of the improved fuel-feeding device;

Figure 9, a view similar to Figure 3 but illustrating the device arranged to control a direct or solid injection system;

Figs. 9a, an enlarged central longitudinal section of the fuel injection pump used in the system of Figure 9;

Figure 10, a sectional diagram of a jet propulsion engine illustrating how the device may be arranged to feed fuel to the combustion chamber or chambers of said engine;

Figures 11, 12 and 13, diagrams illustrating fuel flow characteristics of control systems for jet or gas turbine propelled aircraft engines; and Figure 14, a fragmentary sectional view of an alternative type of control system with respect to that shown in Figure 10; and Figure 15 is an enlarged sectional perspective view of the pressure responsive capsule or aneroid for controlling the metering needle 107 of Figures 1 to 8, inclusive.

Referring to the drawings and first to Figures 1, 1a and 2, the fuel-feeding or charge-forming device as here shown comprises a main housing 10 having a portion shaped to define a fuel pump inlet chamber 11 to which fuel may be supplied from a tank, supply pump, or other suitable source, not shown, through conduit 12. A fuel pump 13, best shown in Figure 2, has a rotor 14 formed with a center bore mounting a cam pin 15 and a series of radial slots mounting blades 16. The rotor is supported for rotation in an open sleeve or cage 17 terminating at its opposite ends in rings 17a which cam the blades radially inwardly against the cam pin 15. The right-hand end of the rotor is reduced to provide a drive shaft 14a which has a pinion gear 18 secured thereon to facilitate a driving connection with the power plant or engine to be supplied with fuel and which is not shown in Figure 1. The pump 13 takes fuel from chamber 11 and forces it under pressure into chamber 19 defined by a wall 20 shown as formed integral with the housing 10 and having portions 20a and 20b which are contoured to receive the rotor cage 17.

An end cap 21 removably secured to the housing 10 supports the sealing and bearing assembly for shaft 14a to which oil may be supplied through duct 22.

The left end of the rotor 14 is rotatable in a stepped bearing and sealing ring 23 mounted in a boss 24 formed integral with the housing or casing 10, a bushing 25 serving to lock the bearing in place. The left end of the rotor is hollow to permit insertion of the cam pin 15, the latter being held against endwise displacement by an abutment member 26 provided with a sealing ring to prevent escape of fuel from the rotor bore, said member being removably held in place by a snap ring 27.

The pump rotor 14 has a driving connection with a governor assembly which, as will be more fully described hereinafter, is arranged to operate a fuel flow controlling valve shown as of the poppet type comprising an elongated valve or valve member 28 formed with a reduced stem 28a. The valve member 28 is mounted to slide in a bushing 29 having an attaching flange 29a secured to a flange 30 forming part of the wall of an unmetered fuel chamber to be described, said bushing being formed with a valve seat defining a valve port 31.

The reduced portion of the valve stem 28a is encircled by a spring 32 which at its left end abuts a shoulder formed on the valve stem and at its opposite end bears against the inner race of a thrust bearing 33 held in adjusted position by end nut 34, the latter serving to adjust and correlate the governor and poppet valve assemblies.

The governor weights are indicated at 35; they are secured on shafts 36 and have formed integrally therewith clutch fingers 37 adapted to engage the thrust bearing 33 and urge the valve 28 toward open position, or to the right as viewed in Figure 1, with a force depending upon the speed of rotation and the resulting centrifugal effect of the weights 35. The shafts or pins 36 are anchored in yokes 38 forming part of a hub 39 carrying the outer races of a bearing assembly 40, the inner races of the bearing assembly being mounted on the bushing 29 and held in place by end nut or collar 41.

A cup 42 is secured on the left end of the rotor 14 by means of a fitting 43 and end nut or collar 44. A driving connection between the rotor 14 and governor is provided by means of lugs 45 projecting radially from the flange of the hub 39 and engaging in open slots 46 formed in the edge of the cup 42. This construction tends toward simplicity and to facilitate assembly. The cup 42 also functions to reduce turbulence of the fuel in the chamber 19 and to limit the throw of the governor weights under certain conditions, as for instance, when there is no appreciable differential pressure across the metering head diaphragm, to be described.

A fuel baffle or shield 42a is preferably mounted on the bushing 29 adjacent the valve port 31; it directs fuel radially from the outer periphery of the governor chamber toward the poppet valve outlet port 31. This baffle coacts with the cup 42 to assist in vapor elimination in a manner to be described, and it also reduces turbulence of the fuel in the region of the poppet valve.

A governor head diaphragm is indicated at 47, Figure 1; it is clamped between the radial portions or flanges of bushings 48 and 49. Bushing 48 is slidingly mounted in a guide sleeve 50 supported by hub 51, while bushing 49 has connected thereto a stem 52 adjustably locked in position by end nut 53. A cable 54 connects at one end with the member 52 and at its opposite end with the stem 28a of valve 28. A bushing 55 steadies the cable, and to stiffen the cable sufficiently to prevent buckling due to idle spring thrust, a relatively light wire spring 56 encircles the cable. An idle spring 57 engages the outer side of the diaphragm bushing 49 and applies predetermined pressure in an opening direction on the poppet valve 28 at low idling speeds to ensure sufficient metering head pressure for idling purposes, said spring being backed by an end plug 58 which is threaded into end cap 59 and is maintained in adjusted position by spring-pressed detent members 60. Since the spring 57 may require delicate adjustment, it is important that the plug 58 be capable of easy adjustment while at the same time it should be held stable when once set or adjusted; and the detent members function advantageously in this respect.

A by-pass chamber 61 communicates with the fuel-intake chamber 11, as best shown in Figure 2; and controlling passage of fuel from the pressure chamber 19 to the by-pass 61 is a relief valve 62 which seats on a valve cage 63 mounted in the upper transverse portion of the wall 20 and provided with ports 63a. The valve has a depending stem carrying a piston member 65 which slides in a vented cylinder 65a, said members 65 and 65a functioning as a dashpot to stabilize the action of the valve 62. A spring 66 is seated in a cup-shaped member 67 secured to the valve 62. A diaphragm 68 of substantially the same mean effective area as the seat of valve 62 is clamped between the member 67 and valve 62 and forms a movable wall of a balancing chamber 70. The spring 66 urges valve 62 onto its seat and allows it to open when the pressure in chamber 19 exceeds the pressure in chamber 70 by some predetermined amount dependent upon the strength of spring 66.

It is important that there be a substantially constant pressure drop across the valve 28, so that the various pressures in the system are balanced; also in fuel-feed systems where an injection nozzle is used as in Figure 3, the metering needle is rendered less sensitive to variations in nozzle pressure. In the present instance, a constant drop across the valve 28 is brought about by connecting the balancing chamber 70 through duct or channel 71, 71a with a fuel chamber 72 into which the port 31 discharges fuel. The chamber 72 is referred to hereinafter as the unmetered fuel chamber since the fuel in this chamber has not as yet passed through the fuel metering orifices hereinafter described. The chamber 70 communicates with by-pass chamber 61 through restricted orifice or bleed 75 to permit complete filling of chamber 70 and to relieve vapor or excess pressure developed in chamber 70 by engine heat when the engine is stopped.

When the pump is initially placed in operation and sufficient pressure is built up in the chamber 19 the valve 62 will open. When this valve opens, fuel is admitted to the chamber 61, and after this chamber fills, fuel will pass through orifice 75 into chamber 70. Since this latter chamber is in communication with the unmetered fuel chamber 72, the pressure on the top side of diaphragm 68 will be unmetered fuel pressure while that on the lower side of valve 62 will be equivalent to that in the governor chamber 19, and the differential between these chambers 70 and 19, or across the diaphragm and valve assembly 68, 62 and hence the drop across the valve 28 will therefore be maintained at a substantially constant predetermined value as determined by spring 66, irrespective of the volume of fuel delivered by the unit.

The valve indicated at 81, Figure 1, is an idle cut-off valve; it is used to completely cut off flow of fuel to the engine to stop the latter. The valve is provided with a stem 82 and a lever 83. In the position shown, the valve is open and fuel may flow through conduit 84, the latter being provided with a coupling member 85 for attachment of a suitable tube or fuel line leading to a spray nozzle, injection pump, burner ring or the like, depending upon what type of power unit is being supplied with fuel.

It will be noted that the conduit or duct 71 connects with its continuation 71a through a valve port 86 controlled by rotary valve 87 mounted on and rotatable with valve stem 82 and cut-off valve 81. Thus when the idle cut-off valve is closed, valve 87 is likewise closed and communication between the unmetered fuel chamber and the chamber 70 is broken. The reason for this is that should the unmetered fuel pressure still be applied to chamber 70 after fuel flow is stopped and during further running of the engine due to momentum, the by-pass valve 62 would require so much pressure to unseat it as to produce dangerously high pressures in the chamber 19.

It is important that vapor be completely eliminated from the pressure chamber in which the governor and poppet valve assembly operate. Since fuel in vapor form is lighter than when in the liquid phase, it tends to gather in the central area of the governor chamber, due to the fact that the heavier liquid fluid is thrown outwardly by centrifugal force, where it (the lighter vapor) affects the buoyant action of the fuel on the governor weights and increases the effective throw of the latter, thereby increasing the metering head and tending toward a rich fuel/air ratio. If sufficient vapor collects to more than fill the spinning cup and the governor chamber, it will pass through the system and result in a lean condition of the fuel/air ratio. Thus, as in other fuel systems, vapor formation tends towards unstable and unsatisfactory operation in general.

In the present instance, a vapor elimination system is provided which takes advantage of the tendency of the vapor to centrifuge or move towards the central area of the governor chamber. The spinning cup 42 which houses the governor weights 35 is formed with a series of holes or openings 90 in the peripheral and end walls thereof, and the hub member 39 is also preferably formed with a series of openings 91, note Figure 1a. The abutment member 26 in the end of the rotor 14 is formed with vapor escape openings 92 through which vapor passes and thence through the space around the abutment member to discharge passages 93 formed in the rotor and extending on through the bearing 23 and terminating in an annular collecting chamber 94 formed in the boss 24. A vapor vent channel 95 communicates the annular chamber 94 with a vapor vent chamber 96, the latter being provided witht a float 97 carrying a valve member 98 slidable on the lower end of a hollow depending stem provided with a port 98', said valve 98 controlling vapor discharge passage 99, which may lead to a fuel tank, not shown, or to some other suitable point such as an air intake conduit. An apertured inverted cup-like member 99' in the chamber 96 provides a smooth internal wall to permit free vertical movement of the float.

The venting system operates as follows:

During periods of operation a continuous flow of liquid and/or vapor occurs from the center portion of the governor chamber through ports 92, 93, annulus 94, and passage 95 to the float chamber 96. In the absence of vapor, the liquid fuel entering chamber 96 fills the chamber and the float closes port 98'. Fuel thereafter supplied to chamber 96 escapes through a passage 100 and restriction 101 to the by-pass chamber 61 which communicates with the pump inlet chamber 11. Any vapor resulting from low pressures, agitation or other causes which enters or is formed in the chamber 19 will, due to centrifugal action, move inwardly through the holes 90, 91 in the wall of the cup 42 and the hub 39 and also through the space between the forward edge of the cup and said hub. This vapor will converge around the axis of the governor and valve assembly and thence pass through the holes 92 in the abutment member 26 and outwardly through the channels or vents 93, annular chamber 94 and channel 95, to the float chamber 96. The baffle 42a insures that only the heavy liquid fuel from the periphery of the governor chamber reaches the valve port 31 and thus facilitates the centrifuge of the fuel in the governor chamber.

Normally, when there is little or no vapor or air in the float chamber 96, the valve port 98' is held closed by the valve 98; but when vapor or air enter said chamber, it depresses the liquid fuel level, the float drops and the valve 98 uncovers port 98', permitting the vapor and air to escape back to the fuel tank through conduit 99. As the vapor escapes, liquid fuel entering chamber 96 raises the fuel level therein and moves the float upwardly to close port 98'.

The venting system illustrated and described herein constitutes the subject matter of application Serial No. 586,224 filed of even date herewith, by Willard F. Blakeway and Albert P. Schnaible.

The unmetered fuel chamber 72, Figure 1, is formed in a casting 102 suitably connected to the main pump housing 10, and the flange 29a of the bushing 29 is connected to the flange 30 of said casting by means of screws 103. Another casting 104 is suitably connected to the casting 102 and is formed with a variable pressure regulator control chamber 105, the latter being separated from the unmetered fuel chamber 72 by the governor head diaphragm 47, but being in controlled communication therewith through a restricted orifice or bleed 106, in a manner and for a purpose to be described.

A metering needle 107, Figure 1, controls metering orifice 107' defined by a seat or bushing located in the wall of chamber 72 and communicating said chamber with the metered fuel chamber 107a from which the fuel flows to discharge conduit 84. The needle 107 is regulated by a pressure-responsive capsule including a manifold pressure bellows 108 (see also Figure 15) secured at its one end to a plate 109 which in turn is connected to a seat 110, the flanged head of the needle being mounted in said seat and urged thereagainst by a light spring 111 held in place by retainer 112. Within the bellows is a main calibrated loading spring 113 and a supplemental loading spring 113' which maintain the bellows in an equilibrium position at given external and internal pressures. The outer end of the bellows is connected to a plate 114 which is secured to the inner end of an end closure and coupling member 115 formed with a vent 116 closed by a removable plug and whereby the bellows may be readily evacuated and sealed. The manifold pressure bellows 108 in the present instance is evacuated to render it responsive to changes in pressure only, temperature compensation being had through a separate control element, to be described. The main loading spring 113 need not necessarily be supplemented by the spring 113', but the use of the latter facilitates accurate loading and renders the bellows more sensitive to pressure changes; it may be compared to a vernier type of adjustment.

An exhaust back-pressure capsule is provided and includes a bellows 117, of reduced size with respect to the bellows 108, having a closure plate at its one end anchored to a bushing 118 secured to the end member 115 and another closure plate at its opposite end connected to a bushing 119 threaded in the outer end of a housing 120, the latter being threaded into a bushing 121 connected to the casting 102. The interior of the back pressure bellows 117 is vented to the atmosphere or to a point in the exhaust manifold of the engine by means of a screened vent 122 connected to the open end of the bushing 119. The inner extremity of the bushing 119 is vented to the interior of the bellows 117 and telescoped over the bushing 118 and the latter is connected to the one end of a stem 123, which is urged outwardly by means of a calibrated spring 124 seated at its inner end on a flange formed interiorly of the bushing 119 and at its opposite or outer end abutting a vented washer 125 held in adjusted position by means of a lock nut 126. This spring 124 and its adjustment facilitates accurate correlation of the back-pressure capsule with the manifold pressure capsule.

It will be seen that when manifold or engine charging pressure is communicated to the chamber 127 defined by the housing 120, it will tend to collapse the bellows 108 and 117 and retract needle 107. Since the bellows 117 is vented to atmosphere, its collapsing action will be resisted in direct relation to changes in exhaust back pressure or changes in atmospheric pressure which may be taken as an index of exhaust back pressure. By adjusting the tension of spring 124 the increment of back pressure represented by the bellows 117 may also be adjusted. Preferably the combined unit is calibrated to produce constant travel of the contoured needle 107 proportional to manifold pressure minus some predetermined increment of exhaust back pressure over the entire metering range. This action can be obtained with a single bellows capsule, but the dual-bellows arrangement herein disclosed has been found easier to construct, calibrate and adjust and more practical in general than a single-bellows unit. The particular increment or fraction of the exhaust back pressure to be used is a variable depending upon the type of engine and its characteristics, particularly with respect to the quantity of residual exhaust gas remaining in the engine cylinder following the exhaust stroke of the engine piston.

Manifold pressure may be communicated to the chamber 127 through a passage 128 formed in the bushing 121, said passage connecting with the manifold by means of conduit 128a, note Figure 3.

The needle 107 is mounted to slide in a guide bushing 129 encircled by a sealing gasket 131. This insures against leakage of fuel from the metering head chamber 72 past the bushing 129 and into the chamber 127. An annular recess or chamber 132 is provided in the bushing 129 around the needle 107, said chamber being vented or drained to a low pressure area such as supercharger suction through passage 133 formed in the bushing 121 and a conduit 133a, note Figure 3. This ensures against leakage of fluid into chamber 127 past the needle 107 while at the same time permitting free movement of the needle.

A control orifice is indicated at 135; it communicates regulator control chamber 105 with metered fuel chamber 107a through channels 136, 136a, the area of said orifice being variable by needle 137. The manner in which this control functions will be more fully set forth in the description of operation, which follows.

The fuel pump 13 may be suitably geared to the engine or power plant to be supplied with fuel and driven thereby. Rotation of the pump rotor 14 causes fuel to be drawn in through conduit 12 from a suitable source of supply, such as a conventional fuel tank, and into the chamber 11, from which it is forced by the rotor blades or vanes into the chamber 19. The relief valve 62 is set to maintain the fuel in chamber 19 at a predetermined pressure, over and above the pressure in unmetered fuel chamber 72. When this pressure is exceeded, the excess fuel is by-passed back to the chamber 11 through the passage or chamber 61.

When the engine is operating, the rotating governor weights 35 and the idle spring 57 tend to open the valve 28 and fuel under pressure is passed through the orifice 31 into the unmetered fuel chamber. The fuel flows through metering orifice 107' into the metered fuel chamber 107a and through the conduit 84 to a fuel discharge nozzle for supplying fuel to an internal-combustion engine, or burner for a gas turbine or jet propulsion engine as the case may be. A small portion of the fuel flows from the unmetered fuel chamber 72 through the restriction 106 into the regulator control chamber 105, thence through the variable orifice 135 into the metered fuel chamber 107a and then through conduit 84 to the nozzle along with the fuel flowing through the metering orifice 107'.

It will be apparent that the pressure in the variable pressure regulator control chamber 105 will be of a value intermediate the unmetered fuel pressure in chamber 72 and the metered fuel pressure in chamber 107a. and will tend to approach the pressure in chamber 72 as the effective area of orifice 135 is decreased by valve 137 and will tend to approach the pressure in chamber 107a as the effective area of orifice 135 is increased. For a given position of valve 137 the differential between the pressures in chambers 72 and 105, which may be aptly termed the governor head, will remain a constant percentage of the differential between the pressures in chambers 72 and 107a, the latter differential being the metering differential pressure effective across the metering orifice 107'. As the valve 28 opens or closes the fuel flow to the nozzle will tend to increase or decrease and the governor head and the metering differential will likewise increase or decrease. The governor head, that is, the differential between the pressures in chambers 72 and 105, is effective on the governor head diaphragm 47 tending to move the diaphragm to the left and tending through cable 54 to move the valve 28 to the left in opposition to the force thereon of the governor weights 35.

The valve 28 will float toward open or closed position until the governor head acting on diaphragm 47 balances the force of the governor weights 35. Since the governor rotates in direct relation to engine speed, the thrust of the governor weights is proportional to speed squared and therefore the balancing differential across diaphragm 47 is maintained proportional to speed squared and the metering head across the metering orifice 107' is also maintained proportional to speed squared. Assuming that the area of the metering orifice 107' is fixed, then flow therethrough would be proportional to the square root of the pressure differential thereacross and hence proportional to engine speed. For a constant condition of manifold pressure and exhaust back pressure, the air flow to the engine will vary in direct proportion to the engine speed, and the control mechanism just described will correspondingly vary the quantity of fuel supplied to the engine or burner.

The mass rate of air flow to the engine in addition to being dependent upon the engine speed is also dependent upon the manifold or charging pressure modified by a predetermined increment or portion of the exhaust back pressure. In order to correspondingly vary the fuel flow with changes in air flow resulting from changes in manifold pressure or exhaust back pressure, the area of orifice 107' is controlled by the needle 107 and the latter is actuated in direct relation to manifold pressure modified by a predetermined increment of back pressure or atmospheric pressure. Thus as manifold pressure is varied, as by actuation of a throttle valve in the air intake conduit of an internal-combustion engine or by variation in speed of a supercharger at a given throttle opening, such variations in pressure will be transmitted to the chamber 127 and imposed on the bellows 108. The pressure in this chamber 127 also acts on the back pressure bellows 117 which is internally vented to atmosphere or to the exhaust manifold through the vent 122 and therefore modifies the travel of the bellows 108 in direct relation to changes in atmospheric pressure. Internal loading of the bellows 108 as determined by the degree of evacuation and the spring rate of the respective springs 113 and 113' is such as to produce a predetermined rate of travel of the needle 107 over the entire metering range. The travel of the bellows and the contour of the needle 107 are correlated to obtain the desired fuel orifice areas throughout such range.

Thus by controlling the fuel metering head substantially in accordance with the square of the engine speed and controlling the area of the fuel metering orifice in accordance with manifold or charging pressure modified to the extent desired for variations in exhaust back pressure, and assuming, for the present, constant temperature of air entering the engine, the desired fuel/air ratios can be obtained throughout the range of variations in engine speed, manifold pressure and exhaust back pressure.

Variation in the position of needle 137 will result in a given percentage change in the fuel supplied to the engine throughout the range of engine operation. Valve 137 therefore is well suited as a manifold temperature compensating device, as will be hereinafter described in connection with Figure 3, or as a mixture ratio control device. For example, a neutral or intermediate control position of needle 137 may be taken at a point where the respective areas of the orifices 106 and 135 are equal and the pressure drops across each orifice are equal. Under these conditions the difference in pressure between chambers 72 and 105 and hence the differential across diaphragm 47 is represented by the drop across orifice 106 and is substantially equal to one-half of the total drop across orifices 106 and 135, the total drop being the metering differential across metering orifice 107'. The differential across diagraphm 47 will retain this one-half relationship at all values of the fuel metering differential or metering orifice areas. If now at a given governor or engine speed and a given area of metering orifice 107', the area of orifice 135 is increased as by raising the needle 137, thereby reducing the pressure in chamber 105, the differential across diaphragm 47 may, for example, become equal to six-tenths of the metering differential pressure instead of one-half. The differential across diaphragm 47 is then too large for balancing the force of the governor weights on valve 28 and the valve will partially close and decrease the fuel flow until the differential across diaphragm 47 is reduced one-sixth, to its former value, with a corresponding percentage reduction in the metering differential across the orifice 107'. The quantity of fuel being delivered through orifice 107' to the engine or burner will accordingly be reduced to approximately the square root of five-sixths of its former value, and this percentage reduction in flow through orifice 107' will be effective throughout the range of engine speeds and settings of needle 107. On the other hand, if the area of orifice 135 is reduced as by lowering the needle 137, the pressure in chamber 105 will increase and the differential pressure across diaphragm 47 will decrease correspondingly. The weights 35 will open the valve 28 an additional amount to increase the fuel flow until the differential pressure across diaphragm 47 is restored to its former value to balance the force of weights 35. This will result in a percentage increase in the fuel flow through metering orifice 107', which percentage enrichment will obtain throughout the range of engine operation. Thus when the area of orifice 135 is at a maximum, the rate of fuel flow will be at a minimum, and when the area of said orifice is at a minimum, the rate of fuel flow will be at a maximum, for any given engine speed and a fixed position of needle 107. The pressure in chamber 105 thus may be selectively varied by needle 137 to accomplish an increase or decrease in the fuel metering differential pressure relative to the differential pressure across the governor head diaphragm, which in turn is maintained in balance with the force of the governor weights 35 by means of the valve 28 which opens or closes to increase or decrease the fuel flow until this balance is established. Stated in another way, adjustment of the control needle 137 adjusts the differential across the metering orifice 107' at a constant engine speed and manifold pressure or other function controlling the metering needle or valve 107. If the fuel-feeding device is used with an internal combustion engine wherein power is controlled by varying the flow of air to the engine, as by means of a throttle valve in the air-intake, upon adjustment of the needle 137 the unit will continue to meter in relation to engine speed and manifold pressure but the rate of fuel flow for a given rate of air flow will vary. On the other hand, if power or speed is controlled primarily by varying the flow of fuel to an engine independently of the air supply, as in the case of a jet propulsion engine, adjustment of the area of bleed 135 will result in acceleration or deceleration of the engine, or will produce an accelerating or decelerating mixture.

Figure 3 shows the fuel-feeding device or speed-density metering pump functioning as an injection carburetor. Those parts which correspond to similar parts in Figures 1, 1a and 2 are given like reference numerals in Figure 3.

An internal-combustion engine 139 is provided with an air-intake conduit 140 having mounted therein a throttle valve 141 adjustable by means of an operating link 142 which may be manually or automatically controlled. A supercharger 143 supplies air under pressure to the engine through manifold or supercharger ring 144 and conduits 144'.

The fuel discharge conduit 84 has connected thereto a pipe 145 which leads to a fuel discharge nozzle generally indicated at 146 provided with a spring-pressed nozzle member 146a moved or retracted from seated position by fuel under pressure acting on diaphragm 146b to permit fuel to be discharged into the air-intake conduit posterior to the throttle through discharge orifice 147. The nozzle may be set to open at a predetermined pressure, say for example, ten pounds p. s. i.

The nozzle 146 may be of any known type, an example being shown in U. S. Patent No. 2,310,984.

The centrifugal head control system including bleeds 106, 135 and the needle 137 is utilized to compensate for changes in temperature, or to adjust the fuel flow in relation to variations in mass air flow resulting from changes in temperature. A lever 148 is pivoted at 149 and has one end thereof connected to the upper end of the needle 137 and the opposite end thereof connected to a rod 150 carried by a bellows 151 mounted in a housing 152, said bellows being maintained in a predetermined collapsed position by a spring 153 and having the interior thereof in pressure communication with a thermal element 154 mounted in the manifold or supercharger ring 144 through pipe or conduit 155. The thermal element, pipe 155 and bellows 151 may be filled with a suitable temperature-responsive fluid so that when the temperature rises in the manifold or supercharger ring 144, the fluid will expand and in turn cause the bellows 151 to expand against the pressure of the spring 153 and actuate the needle 137.

In feeding fuel to the engine, the device functions as described in connection with Figure 1. To accelerate or decelerate the engine, the throttle valve 141 may be adjusted in the conventional manner to control the flow of air through the intake conduit 140. When the flow of air is increased, boost or manifold pressure also increases, and the pressure in bellows chamber 127 rises, causing the needle 107 to retract and enlarge the area of the main metering orifice 107' and increase the flow of fuel to the engine. At the same time the engine increases in speed and the metering head across metering orifice 107' is correspondingly increased. Closing of the throttle results in a reverse cycle of operations. Acceleration and deceleration may also result from control of propeller pitch through a suitable device such as a propeller pitch governor, either coordinated with or independently of throttle control and/or boost pressure, in which event the metering head is varied directly through the action of the governor weights 35, or centrifugal pressure, or through variation in both centrifugal pressure and manifold or boost pressure.

Should the temperature rise in the intake manifold, the bellows 151 will expand, raising the needle 137 and enlarging the area of the orifice 135. When this happens, assuming constant engine speed and manifold pressure, the metering head or differential is decreased resulting in a reduced flow of fuel to the engine thereby rectifying the mixture, or maintaining a predetermined fuel/air ratio. Since increased temperature results in a reduced weight of air or mass air flow, it is desirable that the quantity or rate of fuel should be correspondingly less. On the other hand, should the temperature of the air decrease and its weight or mass flow increase, the needle 137 will be moved downwardly to restrict the bleed 135 thereby increasing the metering head or differential and increasing the flow of fuel to the engine.

As will be obvious, a certain amount of fuel is by-passed around the main metering jet into the metered fuel chamber 107a through bleeds 106 and 135. However, since the bleeds 106 and 135 may be made exceedingly small and yet retain their effectiveness, particularly when the bleed system is used as a temperature-compensating means, this by-passed fuel may be considered negligible. Its principal effect is to produce enrichment in the idle speed range at certain temperatures which in some types of engines and with certain sizes of bleeds may prove objectionable. Since fuel flow is at its lowest value at idling and the range of temperature variation less pronounced, the bleed control system may be dispensed with at this time. Figure 4 illustrates a derichment control which automatically becomes effective when the metering differential attains predetermined minimum and maximum values, to thereby not only eliminate enrichment at idling due to by-passing of fuel around the metering orifice 107 but also compensate for velocity enrichment or an unbalanced fuel/air ratio due to high engine speeds. The orifice 106 is enlarged, and coacting therewith is a valve 156 formed with contoured surface 156'. A diaphragm 157 is located in the wall separating chambers 72 and 105 and is backed by a spring 158, said diaphragm being operatively connected to the valve 156 by means of rod 159 and yoke lever 160 fulcrumed or pivoted at 160'.

The spring 158 balances the differential across diaphragm 157 in a manner such that over a range of speed between a predetermined minimum and a predetermined maximum, the area of orifice 106 is normal, or is of a flow capacity such as will provide the operation heretofore described; and when the speed approaches or reaches such values, the area of the said orifice is restricted and/or cut off entirely, depending upon the contour of the surface 156'. Thus, in the example shown, when the engine speed drops to a certain R. P. M. and the differential across diaphragm 157 likewise drops to a certain value, spring 158 moves the diaphragm to the right, causing valve 156 to gradually restrict and finally cut off or close orifice 106, whereupon the by-pass bleed system becomes ineffective.

When the engine speed reaches a certain predetermined maximum and the differential across diaphragm 157 attains a corresponding maximum value, the spring 158 is compressed to a point where the left-hand extremity of the contoured surface 156' begins to take effect and proportionally reduce the area of bleed 106; whereupon the pressure in chamber 105 is again reduced and the differential across diaphragm 47 correspondingly increased to thereby decrease the rate of fuel flow sufficiently to compensate for velocity enrichment that would otherwise result from high engine speeds.

It will be obvious that the needle 156 could be made to control only one or both of the above factors, as desired, and also that each factor could be controlled by a separate needle to facilitate contouring.

Figure 5 shows a control element located to act on the orifice 106, permitting simultaneous coordinated control of the metering head by the needle 137. In this instance, a needle 161, which may be a temperature-compensating needle, is connected to a bellows 161' having communication with a suitable operating pressure such as the temperature-responsive element 154 of Figure 3 by means of a pipe or tubular conduit 162. A rising temperature will extend the bellows and cause the needle 161 to restrict the passage 106, thereby reducing the pressure in chamber 105 and increasing the differential across the diaphragm 47 of Figure 1 in a valve closing direction, to in turn reduce the metering head across metering orifice 107'. The needle 137 is free for use as a control independently of temperature control; in the case of a jet propulsion engine, for example, it could be used as a power control.

In Figure 6, the chamber 72 communicates with a passage 163 leading to the metering orifice 107' through an orifice 164 controlled by a needle and bellows assembly similar to that shown in Figure 5 and having like parts identified by the same reference numerals. Expansion and contraction of the bellows moves the needle 161 in and out of the orifice 164 and varies the effective available area for fuel flow from chamber 72 to the metered fuel chamber 107a in relation to temperature changes or other operating characteristics. If desired, a bleed or orifice 165 may be used to ensure a minimum fuel metering area. This method of control may be used alone or in conjunction with the metering head control including the bleeds 106 and 135.

Figure 7 illustrates a high speed control or governor which acts to maintain the operating speed of the engine within a predetermined limit. As in Figure 6, the unmetered fuel chamber 72 communicates with the metering orifice 107' through orifice 164' and passage 163'. In this instance, however, the orifice 164' is controlled by a valve 166 connected to a diaphragm 167 and urged away from its seat by a spring 168. Up until the time the engine speed attains a certain R. P. M., the valve 166 remains open and metering proceeds in the usual manner. However, when the engine speed exceeds such value, the governor head, that is the differential between the pressures in chambers 72 and 105, acts on the diaphragm 167 to effect closure of the valve 166, whereupon the fuel flow is materially reduced, effecting a reduction in speed of the engine. Bleed 165' permits sufficient fuel to pass into the chamber 163 to prevent the engine from stalling when valve 166 closes.

Figure 8 shows an arrangement for regulating the metering head to compensate for decreasing charging or volumetric efficiency of the engine at high speed. In this instance the bleed 106 is controlled by a needle 170 carried by a diaphragm 171 urged away from seated position by a spring 172 and toward the orifice 106 by the differential of the pressures in chambers 72 and 105. A channel 173 communicates the chamber 72 with the bleed 106. As the engine speed increases the differential pressure on diaphragm 171 will increase and move the needle 170 to decrease the effective area of orifice 106. This, for reasons heretofore presented, will tend to reduce the metering head across orifice 107' to a value less than otherwise would obtain. The fuel flow to the engine is therefore of less amount to compensate for the decreased volumetric efficiency.

While ordinarily volumetric efficiency reaches a maximum at some intermediate speed, the greatest changes occur in the range from intermediate to maximum speeds. By properly contouring the needle 170 in relation to its travel as determined by the area of diaphragm 171 and the spring rate of spring 172, and by using a needle of reversing contour whereby the effective area of orifice 106 will first increase and then decrease as the needle 170 moves to the left with increase in speed, compensation for variations in volumetric efficiency may be accomplished through the entire speed range, both above or below said intermediate speed.

Figure 9 illustrates a direct-injection system incorporating the improved metering unit as a regulator. An internal-combustion engine is diagrammatically shown at 200, air being supplied to the engine through induction or air-intake conduit 201 provided with a throttle valve 202 actuatable by a control link 203. The throttle may be manually controlled by a pilot or be arranged for automatic or combined automatic and manual control as desired. A supercharger 204, driven from the engine through suitable gearing indicated at 204', delivers air under pressure to supercharger ring or manifold 205 and manifold pipes 206 which lead to the respective engine cylinders 207, the latter each being provided with an inlet valve 208, exhaust valve 209 and piston assembly 210.

Parts which correspond to similar parts in Figures 1 to 3, inclusive, are given like reference numerals in Figure 9. Thus the housing of the fuel-feeding device or regulator is indicated at 10, the metering head chamber at 72 and the control chamber at 105. The pump draws fuel from a supply tank 211 through conduit 212 and delivers metered fuel under pressure through conduit 213 to a fuel-injection pump generally indicated at 214. This injection pump is shown in Figure 9a and is substantially similar to the pump shown and described in a copending application of LeRoy Evans Serial No. 475,783, filed February 13, 1943, now Patent No. 2,447,268, issued August 17, 1948. Briefly, it includes a fuel reservoir 215 which is in flow communication with the discharge conduit 84 of Figure 1 by means of the pipe line 213. Pressure of the metered fuel in reservoir 215 is applied to the inner face of a diaphragm 216 for controlling the effective fuel delivery of the injection pump, the outer face of said diaphragm forming the movable wall of a chamber 217 which is in pressure communication with the induction conduit 201 anterior the throttle by means of pipe or conduit 218. The diaphragm 216 is operatively connected to a rod 219 by means of lever 220 pivotally anchored to the pump housing, said rod at its inner free end abutting a bearing member connected to or forming part of a piston assembly including piston 221 slidable in a cylinder 222. The piston 221 is urged to the left as viewed in Figure 9a against the resistance of a return spring 223. A series of pumping plungers 224 are disposed in annular formation around the piston 221, each plunger being slidable in a bushing 225 against the resistance of a return spring 226. The plungers are successively actuated to deliver a pumping stroke by means of a wobble plate 227 driven from a main drive shaft 228 through a universal coupling assembly, said shaft in turn being driven in timed relation to the engine by any suitable means including gearing indicated at 229, Figure 9. The wobble plate 227 cams against plunger tappets 230 coaxially alined with the respective pump plungers 224 and slidable in bushings 231 encircled by springs 232. The plungers and tappets are preferably made as separate abutting parts to accommodate minor variations in alignment of their bushings 225 and 231 without any tendency to bind the assembly, and the springs 232 are provided to move the tappet out of engagement with the wobble plate in the event a plunger becomes stuck. The wobble plate and tappets operate in a bath of lubricating oil preferably circulated under pressure. Metered fuel in the reservoir 215 flows through ports 233 in piston 221 to space 234, from which it flows through annular port 235 and radial channel 235' into a central bore 236 formed in each plunger 224. In the region of the annular port 235, each plunger has slidably mounted thereon a by-pass sleeve 237 carried by a plate 238 movable with the piston 221. In Figure 9a the upper plunger shown in section is in its extreme righthand position corresponding to the end of the stroke. Upon rotation of the wobble plate 227, this plunger will move to the left until the annular port passes to the left of the by-pass sleeve 237, at which time metered fuel will enter the bore 236 and fill the pumping space 239 adjacent the right end of the plunger in which a spring-pressed check valve 240 is mounted. Upon movement of the plunger to the right, fuel will be pumped back out of the annular port 235 until it passes into lapped relation with by-pass sleeve 237, which determines the beginning of injection. Further movement of the plunger to the right forces the trapped fuel past the check valve 240 into a discharge passage 241 from which it passes under nozzle pressure through fuel line 242 to injection nozzle 243, Figure 9, which discharges the fuel under high pressure into the engine cylinder. Fuel discharge from the injection nozzle continues until an annular port 244 formed around the plunger 224 and communicating with the bore 236 passes into registry with annular port 245 formed in the bushing 225 and vented to the space 236, whereupon the fuel remaining in the said bore is pumped back into said space. Thus the pressure of the fuel being pumped is suddenly relieved and injection quickly cut off, avoiding dripping at the injection nozzle. By varying the position of the by-pass sleeves 237, the effective pumping capacity of the pump may be varied from zero to maximum. Since the diaphragm 216 is operatively connected to the said sleeves 237 through fulcrumed lever 220, rod 219 and plate 238, the exact volume of fuel comprised in each charge to the engine cylinders is determined by the effective position of the diaphragm. If the pressure of the metered fuel increases, the pressure in fuel reservoir 215 increases, thereby forcing the diaphragm outwardly against the resistance of spring 223 and moving the by-pass sleeves 237 to the left to correspondingly increase the volume of fuel comprised in each injected charge; a decrease in metered fuel pressure relieving the pressure on the inner side of the diaphragm whereby the by-pass sleeves move to the right due to the action of the spring 223. The diaphragm chamber 217 may be vented to the air-intake conduit or scoop anterior the throttle, or to the atmosphere.

To slightly richen the mixture upon acceleration, a diaphragm 246 urged upwardly by spring 247 is provided. A connection 248 posterior to the throttle transmits suction to the outer face of the diaphragm at idling or cruising speeds and draws it downwardly whereupon fuel flows into chamber 249. Upon a sudden drop in vacuum accompanying acceleration, the spring 247 forces the diaphragm upwardly, injecting fuel into the reservoir 215. Also, the fuel introduced into chamber 249 compensates for the increase in the effective column of chamber 215 resulting from outward displacement of diaphragm 216, otherwise a portion of the fuel being metered would be used to fill this increased volume instead of being injected into the engine.

A hand-operated wobble pump 250 (Figure 9) is installed in the fuel line 212 between the tank and metering pump; it may be used in conjunction with the rotor 14 of Figures 1 and 1 to build up pressure in the system for starting and for other purposes.

A general description of the operation of the system of Figure 9 follows:

Control of power may be primarily through the throttle 202, which may be operated either automatically or manually to vary the flow of air to the engine. The regulator will tend to meter the fuel in the same manner as described in conjunction with Figures 1 to 3 inclusive, metering being proportional to the product of manifold or boost pressure corrected for changes in temperature and exhaust back pressure times engine speed. If the injection pump is not delivering sufficient fuel to the engine, the metering head across the orifice 107' would be deficient and the head across the governor head diaphragm would be insufficient to balance the governor weights. The weights therefore would open further the valve 28 which would result in an increase in the fuel pressures throughout the system. The pressures would increase until the pressure in pump chamber 215 was sufficient to move the piston 221 and by-pass sleeves 237 to the left to increase the effective stroke of the pump plungers sufficiently to deliver the desired quantity of fuel to the engine, at which time the governor head across diaphragm 47 would just balance the force of the governor weights. The injection pump 214 with its pumping plungers timed with the engine cycle takes the metered fuel from the reservoir 215 and distributes it in individual charges to the respective engine cylinders, injection occurring during the intake stroke of the piston. Thus a predetermined fuel/air ratio may be maintained irrespective of lost motion which may take place in the mechanism for actuating the pumping plungers and which lost motion may result from wear on the tappets, wobble plate and coacting mechanism or the plungers themselves.

Figure 10 illustrates the improved fuel-feeding device or metering pump adapted to supply fuel to the burner or burners of a jet propulsion engine. The engine or power plant as more or less diagrammatically illustrated in Figure 10 comprises a casing 300 which is contoured to define a generator chamber 300' at its one extremity and a reaction tube 300'' at its opposite extremity. At its forward or intake end the casing is provided with curved cowling 301 defining an air-intake passage 302. A dynamic or rotary air compressor 303 is mounted in the intake passage on a shaft 304 supported by a bearing member 305 having at its rear extremity a series of radially projecting arms terminating in guide vanes 306. Also mounted on the shaft 304 is a turbine 307 having a series of turbine blades 307' adapted to be driven by heated and expanded exhaust gases from a series of burners 308 mounted in annular formation in the chamber 300' and which may be substantially as illustrated and described in my copending application Serial No. 557,812, filed October 9, 1944.

Air entering the inlet 302 is picked up by the compressor, which acts to compress the air into chamber 300' and thence into the burner units or individual burners 308, where heat is added by the combustion of fuel and the expanded exhaust gas is directed through the blades 307' of the turbine 307 to drive the compressor and is then discharged to the atmosphere through the reaction tube 300'' to effect propulsion of the plane in which the engine may be installed.

When a centrifugal compressor is connected to and rotated in synchronism with a gas turbine driven by the energy of expanded gases produced in a combustion chamber or burner in which the air is compressed, certain fundamental relations exist. Thus at a given entering air density the weight of air flowing will vary approximately with the R. P. M., the pressure rise through the compressor may vary approximately with the R. P. M.$^2$, and the power consumed by the compressor may vary approximately with the R. P. M.$^3$. When the power is controlled by regulation of the fuel feed, the rate of feed required may vary approximately with the R. P. M.$^3$. Hence if fuel feed is controlled by a suitable device such as a power control lever and the latter is advanced or retarded to obtain a selected speed or power output, the turbine speed will either increase or decrease until a speed corresponding to the rate of fuel feed is attained. Substantially the same conditions are present when the turbine drives an aircraft propeller, and the connection from the turbine receives air from a forwardly disposed opening.

Fuel control systems for jet propulsion engines and gas turbines heretofore have been of one of two types; one, simple governor control of the fuel supply to partially cut off the fuel when the selected speed is attained; and two, fuel rate selection in which the fuel rate is selected and the engine or machine speeds up or slows down to a speed corresponding to the selected fuel rate.

Figure 11 illustrates the type of fuel control obtained with the governor control system. In this figure curve A represents the normal or inherent speed vs. fuel rate characteristic of this class of engines, and curve B represents the fuel pumping capacity of the fuel supply pump. If now the engine is operating at speed $a$ with a corresponding fuel consumption rate and it is desired to change to speed $b$, the load or setting of the speed governor controlling the fuel control valve is reset to correspond to speed $b$. The governor being out of balance will open the fuel valve wide open and the fuel supplied to the engine will suddenly increase to the capacity of the supply pump, as illustrated by the portion $c$ of the dotted curve. In view of the increased fuel the engine will accelerate and the fuel supplied will follow along curve $d$ until the speed corresponding to the new governor setting is approached and the governor functions to reduce the fuel rate along curve $e$ until point $b$ is reached when the engine reaches equilibrium operation. During this period of acceleration the quantity of fuel supplied to the burner is greatly in excess of that required for the quantity of air being delivered to the burners and as a consequence an extremely hot flame is produced which tends to burn out the burner tubes 308 and the turbine blades 307' thereby greately shortening the life of the engine.

A further disadvantage is experienced upon deceleration, in that a change in governor setting from speed $b$ to speed $a$ tends to result in full closing of the fuel valve until the engine slows down, thereby providing a deceleration fuel rate curve of the type illustrated by the dotted curve $f$ in Figure 11. In such case the fuel rate is reduced drastically whereas the air supplied to the burner is reduced slowly as the momentum of the compressor is gradually dissipated. As a result an extremely lean mixture is present at the burners and the burners tend to go out.

In the second of the above mentioned heretofore used control systems, namely the selected fuel rate systems, the fuel feeding characteristic is as illustrated in Figure 12. If while operating at speed $a$ it is desired to change to speed $b$, the fuel rate is changed from that at $a$ to that at $b$. The fuel supply characteristics during this acceleration is as shown by the dotted curves $g$ and $h$. During deceleration from $b$ to $a$ the fuel rate characteristic is as indicated by the curves $i$ and $j$. With this control the richness during acceleration and leanness during deceleration are not as excessive as with the control illustrated by Figure 11, but they are still greater than desired.

A greatly improved fuel control system for jet or gas turbine propelled engines is accomplished by the use of the fuel-feeding device of Figures 1, 1a and 2 (with or without the auxiliary controls of Figures 4 to 8, inclusive) which may be readily adapted to feed fuel to engines or power plants of the above noted type. As illustrated in Figure 10, liquid fuel is supplied to the burners by the metering pump or fuel-feeding device shown in Figures 1, 1a, and 2, the gear 18 secured on the rotor shaft 14a of Figure 1 being driven from the shaft 304 through the medium of bevel gears 309, 310 and shaft 311. Metered fuel from the discharge chamber 107a of Figure 1 is conducted through a fuel line 312 to a burner ring or manifold 313 from which pipes 314 lead to individual burner nozzles 315. The needle 137 (Figure 1) is suitably connected to a power control lever (not shown) in the pilot's compartment by means of a link 316, bell crank 317, link 318 and pivoted lever 319; and the combination manifold pressure and exhaust back pressure bellows assembly of Figure 1 is replaced by a bellows 320 which is responsive to changes in pressure and temperature and therefore changes in density of the air entering the inlet 302. The bellows is subjected to entering air pressure by means of holes 321 provided in the cowling 301, preferably opening in the direction of travel so as to be subject to the ramming action due to the forward velocity of the craft. A type of bellows suitable for such service is disclosed in U. S. Patent No. 2,376,711, dated May 22, 1945. Additional holes 321' are provided at the side or rear of the cowling to provide circulation therethrough so that the temperature of the air within will truly represent the entering air temperature. The bellows may be evacuated and spring-loaded and filled with a damping fluid and an inert gas. A suitable bellows for this purpose is disclosed in a copending application of Elmer A. Haase et al., Serial No. 525,278, filed March 6, 1944, now Patent No. 2,470,742, issued May 17, 1949.

The engine or power plant of Figure 10 is shown mounted in a nacelle 322, usually provided in the wing or body of an airplane for this purpose, a ring 323 fixed against the inner wall of the nacelle serving as an anchor and the engine casing being connected to said ring by brackets 324.

In describing the operation of the fuel-feeding device of Figure 10, reference should also be had to Figures 1 and 13. Assume for purpose of illustration that the engine is operating at a given altitude with the needle 137 set in position corresponding to operation at point $a$ in Figure 13, the governor head across diaphragm 47 being just sufficient to balance the force of the governor weights 35, and the metering head across orifice 107' and the setting of valve 107 being such that the quantity of fuel delivered corresponds to the fuel rate at point $a$.

As has been pointed out heretofore, in connection with Figure 1, the metering pump for a given setting of needle 107 will deliver fuel in direct proportion to the speed of the pump or engine, the quantity at a given speed being dependent upon the setting of needle 137. Thus the quantity vs. speed relationship for increments of closing movement of needle 137 would be as indicated by curves $k$, $l$, $m$ and $n$ respectively, in Figure 13, the curved low speed portion of these curves being caused by the effect of the idling spring 57. With needle 137 set for the $k$ curve, the engine speed would increase or decrease until the fuel delivered satisfies the engine fuel requirement, a condition which occurs at $a$. If now the needle 137 were partially closed, to a setting corresponding to curve $n$, the fuel delivered would increase as indicated by the dotted line $o$ until curve $n$ was reached after which the fuel rate would increase along line $n$ (or dotted line $p$) as the speed increased, until point $b$ was reached at which speed the engine reaches an equilibrium condition, the quantity of fuel supplied by the pump being equal to the fuel required as indicated by curve A. The metering device or pump thus prevents excessive initial enrichment at the time the power control lever is advanced and accomplishes gradual increase in quantity of fuel as the speed of the engine increases whereby sufficient enrichment is provided for adequate acceleration through the increasing speed range.

During deceleration from $b$ to $a$ the fuel metering characteristics of the device are as indicated by the dotted lines $r$ and $s$, as will be readily apparent. This prevents excessive leanness on deceleration, which otherwise might put out the burners.

Upon a decrease in entering air density, as with increase in altitude, less fuel is required to drive the turbine 307 and compressor 303 at a given speed. Therefore, in order to compensate for changes in air density, the area of the metering orifice 107' is varied by the bellows 320. Thus a gain in altitude and resultant decrease in density results in elongation of the bellows 320 and a reduction in area of the metering orifice 107', thereby reducing the flow of fuel to the engine for a given speed. An increase in density has a reverse effect.

Obviously, any of the controls illustrated in Figures 4 to 8, inclusive, may be used with the system of Figure 10. Thus the overspeed control of Figure 7 may prove desirable, or the supplemental metering head control of Figure 8. It may also be found desirable to influence the metering head in relation to entering air temperature in addition to the compensating effect provided by the bellows 320, in which event the controls of Figures 5 and 6 may be applicable.

Figure 14 illustrates an alternative arrangement with respect to Figure 10 wherein power is controlled by directly varying the area of the metering orifice 107' while changes in air density or mass air flow are compensated for by varying the area of the control bleed or orifice 135. Accordingly, the needle 137 is operatively connected to a density-responsive capsule or bellows 325 by means of lever 326 and link 327, and which bellows may be loaded for both pressure and temperature response in a manner similar to the bellows 320.

The metering orifice 107' is controlled by a needle 328 operatively connected to a pilot's control lever, not shown, by means of suitable linkage indicated at 329 and 330.

To accelerate, the needle 328 is retracted or moved in a direction to enlarge the orifice 107', thereby tending to reduce the drop across the orifice and to likewise reduce the differential across the diaphragm 47. The metering pump immediately acts to restore the differential, the metering head is increased and fuel flow to the engine correspondingly increases. The fuel flow characteristics for this modification are the same as for the device of Figure 10 as shown by Figure 13.

To decelerate, the needle 328 is advanced into the orifice 107', its area is restricted, the differential across diaphragm 47 tends to increase whereupon the governor partially closes the fuel valve 28 to restore the differential across diaphragm 47 to balance the governor weights. As the engine slows down the differential is gradually reduced until the engine speed and fuel rate reach the desired condition for equilibrium operation.

Should there be a decrease in air density resulting from an increase in altitude and/or rise in air temperature, the bellows 325 expands, needle 137 is retracted from orifice or bleed 135 and the metering head is decreased, thereby decreasing fuel flow for a given engine speed and compensating for the decrease in the weight of air being pumped to the burners; an increase in density resulting in a reversal of the foregoing operation.

Any of the auxiliary controls illustrated in Figures 4 to 8, inclusive, may be incorporated in the system of Figure 11 subject to obvious modification in structure and arrangement of parts.

It will be understood that no attempt has been made herein to set forth all of the various advantages, applications and metering characteristics of the fuel-feeding system and accompanying apparatus comprised in the instant invention; and it will also be understood that the drawings are simply illustrative of the invention and that in actual practice it is usually necessary to rearrange and modify the construction of the parts to adapt the system to different installations. All such changes and modifications are contemplated which fall within the scope of the invention as defined by the appended claims.

I claim:

1. In a device for controlling the supply of fuel under pressure to an engine, a flow passage having a metering orifice therein, a valve in said passage for controlling flow of fuel therethrough, a movable control element operatively connected to said valve, and means for subjecting said element in a valve opening direction to a force variable in response to variations in engine speed and in a valve closing direction to a force proportional to the differential pressure across said metering orifice, said means including a variable pressure control chamber, an orifice communicating said chamber with said passage upstream of said metering orifice, said chamber being in hydraulic pressure communication with said element, another orifice communicating said chamber with said passage downstream of the metering orifice, and control means for selectively varying the area of one of said orifices.

2. In a device for supplying fuel under pressure to an engine, a flow passage having a metering orifice therein, a valve in said passage for controlling flow of fuel therethrough, a diaphragm operatively connected to said valve, and means for rendering said diaphragm responsive to the pressure difference between a force variable in response to variations in engine speed and a force proportional to the differential pressure across said orifice, said means including a variable pressure control chamber in hydraulic pressure communication with said diaphragm and in restricted flow communication with said passage downstream of said valve and upstream of said metering orifice, and control means for selectively bleeding fuel from said control chamber to said passage downstream of said metering orifice.

3. In a device for controlling the supply of fuel to an engine, a fuel conduit having a metering orifice therein, a fuel valve for controlling flow of fuel through said conduit, a pump for supplying fuel under pressure to said conduit, a movable element connected to said valve, an unmetered fuel chamber on one side of said element and a variable pressure control chamber on the opposite side thereof, means for rendering said element responsive to the pressure difference between a force variable with variations in engine speed and a force proportional to the fuel metering head across said orifice, a restricted flow passage communicating the control chamber with the unmetered fuel chamber upstream of the metering orifice and another restricted flow passage communicating the control chamber with the fuel conduit downstream of said metering orifice, and a control element for varying the effective area of one of said restricted flow passages.

4. In combination with an internal combustion engine having a throttle controlled air intake passage including an intake manifold, a fuel feeding system including a fuel flow passage terminating in a discharge nozzle adapted to discharge fuel under predetermined pressure, means for supplying fuel under pressure to said nozzle through said fuel passage, a metering orifice in said fuel passage and an element controlling said orifice as a function of manifold or charging pressure, a fuel valve for controlling flow of fuel through said fuel passage, a pressure responsive element operatively connected to said valve, means for rendering said latter element responsive to the pressure difference between a force variable in response to variations in engine speed and a force proportional to the fuel metering head, and means responsive to changes in temperature of the air flowing to the engine for varying the differential across said pressure responsive element.

5. In combination with an internal combustion engine having an air supply passage, a fuel feeding system including a fuel flow passage terminating in a discharge nozzle adapted to discharge fuel under predetermined pressure, means for supplying fuel under pressure to said nozzle through said fuel passage, a metering orifice in said fuel passage and an element controlling said orifice as a function of the pressure of the air in said air supply passage, a fuel valve for controlling flow of fuel through said fuel passage, a diaphragm operatively connected to said valve, means for rendering said diaphragm responsive to the pressure difference between a force variable in response to variations in engine speed and a force proportional to the differential pressure across said orifice, a variable pressure control chamber in hydraulic pressure communication with said diaphragm and in restricted flow communication with said fuel passage downstream of the fuel valve and upstream of the metering orifice, and means responsive to changes in an operating condition of the engine for variably bleeding fuel from said control chamber to said fuel passage downstream of said metering orifice.

6. In a device for controlling the supply of fuel to an engine, a fuel flow passage having a metering orifice therein, a valve controlling flow of fuel through said passage, means for controlling said valve to maintain a metering head as a function of engine speed including a movable control element operatively connected to the valve and adapted to respond to the pressure differential between a force variable in response to variations in engine speed and a force proportional to the metering head, means for subjecting said element to a variable regulating pressure, and means for automatically varying the effectiveness of said regulating pressure at predetermined engine speeds.

7. In a device for controlling the supply of fuel under pressure to an engine, a fuel flow passage having a metering orifice therein, a fuel valve in said passage for controlling flow of fuel therethrough, and means for controlling said valve as a function of engine speed including a movable control element operatively connected to the valve and adapted to respond to the pressure difference between a force variable with variations in engine speed and a force proportional to the head of fuel across said orifice, a variable pressure control chamber in restricted inflow communication with said passage upstream of said metering orifice and in hydraulic pressure communication with said element, means for variably bleeding fuel from said control chamber to regulate the differential across said element, and means for automatically varying the effectiveness of the said differential at predetermined engine speeds.

8. In a system for supplying fuel under pressure to an engine, a fuel flow passage having a metering orifice therein, a fuel valve in said passage for controlling flow of fuel therethrough, means for controlling said valve as a function of engine speed including a movable control element operatively connected to the valve and adapted to respond to the pressure difference between a force variable with variations in engine speed and a force proportional to the head of fuel across said orifice, a variable pressure control chamber in restricted inflow communication with said passage upstream of said metering orifice and in hydraulic pressure communication with said element, a flow passage having a restriction therein communicating said control chamber with said first-named flow passage downstream of said metering orifice, means for varying the area of said restriction to regulate the differential across said element, and means for automatically rendering said control chamber inoperative at low or idling speeds.

9. In combination with an internal combustion engine having a throttle controlled air intake passage including an intake manifold, a fuel feeding system including a fuel flow passage terminating in a discharge nozzle adapted to discharge fuel under predetermined pressure, means for supplying fuel under pressure to said nozzle through said fuel passage, a metering orifice in said fuel passage and a needle for varying the area of said orifice, means responsive to changes in manifold pressure for controlling said needle, a fuel valve in the fuel passage for controlling flow of fuel therethrough, means for controlling said valve as a function of engine speed including a diaphragm operatively connected to said valve and adapted to respond to the pressure difference between a force variable with variations in engine speed and a force proportional to the head of fuel across said orifice, a variable pressure control chamber in restricted inflow communication with said fuel flow passage upstream of said metering orifice and in hydraulic pressure communication with said diaphragm, a by-pass communicating said control chamber with said fuel flow passage downstream of said metering orifice, a restriction in said by-pass, a control element controlling said restriction, means responsive to changes in the temperature of the air flowing to the engine for regulating said control element, and means responsive to engine speed for varying the effectiveness of said control chamber at predetermined low or idling speeds.

10. In a system for supplying fuel under pressure to an engine, a fuel flow passage having a metering orifice therein, a fuel valve in said passage for controlling flow of fuel therethrough, means for controlling said valve as a function of engine speed including a diaphragm operatively connected to the valve and adapted to respond to the pressure difference between a force variable with variations in engine speed and a force proportional to the head of fuel across said metering orifice, a variable pressure control chamber and means separating said chamber from said fuel flow passage upstream of said metering orifice including said diaphragm and a wall having a restriction therein for bleeding fuel from said passage to said control chamber, a by-pass also having a restriction therein communicating said control chamber with said fuel flow passage downstream of said metering orifice, means for varying the area of one of said restrictions to in turn vary the effective differential across said diaphragm, and means responsive to changes in engine speed for varying the area of the other of said restrictions.

11. In a system for supplying fuel under pressure to an engine, a fuel flow passage having a metering restriction therein, a fuel valve in said passage for controlling flow of fuel therethrough, means for controlling said valve as a function of engine speed including a movable control element operatively connected to the valve and adapted to respond to the pressure difference between a force variable with variations in engine speed and a force proportional to the head of fuel across said restriction, a variable pressure control chamber, a passage having a restriction therein communicating said fuel flow passage with the control chamber upstream of said metering orifice, said control chamber being in hydraulic pressure communication with said element, a by-pass having a restriction therein communicating said control chamber with said first-named flow passage downstream of said metering orifice, means responsive to changes in an engine condition for controlling one of said restrictions, and means responsive to another engine condition for controlling another of said restrictions.

12. A system as claimed in claim 11 wherein means responsive to changes in the temperatures of air flowing to the engine controls one of said restrictions and manually controllable means is provided for varying the area of another of said restrictions.

13. In a system for supplying fuel under pressure to an engine, a fuel flow passage having a metering orifice therein, a fuel valve in said passage for controlling flow fuel therethrough, means for controlling said valve as a function of engine speed including a movable element operatively connected to the valve and adapted to respond to the pressure difference between a force variable with variations in engine speed and a force proportional to the head of fuel across said orifice, a variable pressure control chamber in restricted inflow communication with said passage upstream of said metering orifice and in hydraulic pressure communication with said element, a by-pass having a restriction therein for bleeding fuel from said control chamber to said first-named flow passage downstream of said metering orifice, and means responsive to changes in an operating condition of the engine and operative independently of the fuel valve for varying the flow of fuel to said metering orifice through said fuel flow passage.

14. In a system for supplying fuel under pressure to an engine, a fuel flow passage having a metering orifice therein, means responsive to an engine condition for controlling said orifice, a fuel valve in said passage for controlling flow of fuel therethrough, means for controlling said valve as a function of engine speed including a movable control element operatively connected to the valve and adapted to respond to the pressure difference between a force variable with variations in engine speed and a force proportional to the head of fuel across said orifice, a variable pressure control chamber in hydraulic pressure communication with said element, a passage having a restriction therein communicating said chamber with said passage upstream of said metering orifice, another passage also having a restriction therein communicating said control chamber with said flow passage downstream of said metering orifice, means for regulating the flow through one of said restrictions to in turn regulate the pressure in said control chamber, a valve port in said fuel flow passage between said fuel valve and said metering orifice, a valve element controlling said port, and means responsive to an engine condition such as changes in temperature for controlling said latter element.

15. In a system for supplying fuel under pressure to an engine, a fuel flow passage having a metering orifice therein, a fuel valve in said passage for controlling flow of fuel therethrough, means for controlling said valve as a function of engine speed, a valve port in said passage between said fuel valve and said metering orifice, and a valve responsive to a pressure varying with variations in engine speed controlling said port for reducing the metering head when the engine attains a predetermined speed.

16. A system as claimed in claim 15 wherein means are provided for maintaining a minimum flow of fuel to the metering orifice when said second-named valve is closed.

17. In a system for supplying fuel under pressure to an engine, a fuel flow passage having a metering orifice therein, a fuel valve in said passage for controlling flow of fuel therethrough, means for controlling said valve as a function of engine speed including a movable control element operatively connected to the valve and adapted to respond to the differential between a force variable with variations in engine speed and a force proportional to the head of fuel across said orifice, a variable pressure control chamber in restricted flow communication with said passage upstream of said metering orifice and in hydraulic pressure communication with said element, means for regulating the pressure of fuel in the control chamber, and means responsive to a pressure varying with variations in engine speed for regulating the flow of fuel from the fuel flow passage to said control chamber.

18. In a system for supplying fuel under pressure to an engine, a fuel flow passage having a metering orifice therein, a fuel valve in said passage controlling flow of fuel therethrough, means for controlling said valve as a function of engine speed including a movable control element operatively connected to the valve and adapted to respond to the differential between a force variable with variations in engine speed and a force proportional to the metering head, a variable pressure control chamber in hydraulic pressure communication with said element, a restricted orifice arranged to bleed fuel from said passage upstream of said metering orifice to said chamber, means for bleeding fuel at a varying rate from said control chamber to vary the differential across said element at a given engine speed, a contoured needle for varying the effective area of said restricted orifice, and means responsive to a pressure varying with variations in engine speed for controlling said needle.

19. In a device for supplying fuel to an engine, a fuel flow passage having a metering orifice therein, means for maintaining a metering head across said orifice as a function of engine speed including a fuel valve controlling flow of fuel through the passage and adapted to respond to the pressure differential between a force varying with variations in engine speed and a force varying with variations in the metering head, a speed governor valve controlling flow of fuel through said passage between the fuel valve and metering orifice, and means responsive to a pressure varying with variations in engine speed controlling said governor valve.

20. In a device for supplying fuel to an engine, a fuel flow passage having a metering orifice therein, means for maintaining a metering head across said orifice as a function of engine speed including a valve controlling flow of fuel through the passage and a control element therefor responsive to the pressure difference between a force varying with variations in engine speed and a force varying with variations in the fuel metering head, a variable pressure control chamber, a restricted orifice communicating said chamber with said fuel passage upstream of said metering orifice, said chamber being in hydraulic pressure communication with said element, another restricted orifice communicating said control chamber with said fuel flow passage downstream of said metering orifice, a valve for varying the effective area of one of said restricted orifices to regulate the pressure in the control chamber, power control means for selectively actuating said latter valve, another valve controlling said metering orifice, and means responsive to changes in density of the engine air supply controlling said last-named valve.

21. In a device for controlling the supply of fuel to an engine, a fuel flow passage having a metering orifice therein, means for maintaining a metering head across said orifice as a function of engine speed including a valve controlling flow of fuel through said passage and a movable control element connected to the valve and adapted to respond to the pressure difference between a force varying in relation to variations in engine speed and a force varying with variations in the fuel metering head, a control chamber in restricted flow communication with said fuel passage upstream of said metering orifice and in hydraulic pressure communication with said element, a by-pass communicating said control chamber with said fuel passage downstream of said metering orifice, a restricted orifice in said by-pass, a valve controlling said latter orifice, the drop across the metering orifice and hence the rate of fuel flow being controlling by regulating said latter valve, another valve controlling said metering orifice, and means responsive to changes in density of the atmospheric air controlling said last-named valve to vary the effective area of the metering orifice.

22. In a device for supplying fuel to an engine, a fuel flow passage having a metering orifice therein, means for maintaining a metering head across said orifice as a function of engine speed including a valve controlling flow of fuel through the passage and provided with a control element adapted to respond to the pressure difference between a force varying with variations in engine speed and a force varying with variations in the fuel metering head, a variable pressure control chamber, a restricted flow orifice communicating said chamber with said fuel passage upstream of said metering orifice, said chamber being in hydraulic pressure communication with said element, a by-pass communicating said control chamber with the fuel passage downstream of said metering orifice, another restricted orifice in said by-pass, a valve controlling the area of one of said restricted orifices, means responsive to changes in density of the atmospheric air controlling said latter valve, another valve controlling said metering orifice, and power control mechanism for controlling said last-named valve.

23. In a device for supplying fuel to an engine, a fuel flow passage having a metering orifice therein, means for maintaining a metering head across said orifice as a function of engine speed including a valve controlling flow of fuel through the passage, a pressure responsive element connected to said valve and adapted to respond to the pressure difference between a force varying with variations in engine speed and a force varying with variations in the fuel metering head, means for imposing an independently controllable pressure on said element, means responsive to changes in air density controlling said latter pressure, and power control means for regulating the area of said metering orifice.

24. In a metering device for supplying fuel to an engine, a fuel flow passage having a metering orifice therein, a fuel valve upstream of said orifice, that portion of the fuel flow passage between the valve and orifice constituting an unmetered fuel chamber, another fuel chamber upstream of said valve, means for supplying fuel under pressure to said second-named chamber, a centrifugal governor in said second-named chamber connected to said valve and adapted to be driven in synchronism with the engine, a diaphragm also connected to said valve and having one face thereof exposed to the fuel pressure in said unmetered fuel chamber, rotation of said governor exerting a force on said diaphragm in a valve opening direction and the pressure of the fuel in said unmetered fuel chamber opposing said force, a by-pass chamber, a relief valve separating said by-pass chamber from said second-named chamber, a balancing chamber adjacent said by-pass chamber, a diaphragm connected to said relief valve, means communicating the balancing chamber with said unmetered fuel chamber to maintain a constant pressure difference between the balancing chamber and said second-named chamber, and resilient means urging said relief valve toward seated position against the pressure of fuel in said second-named chamber, said resilient means maintaining a predetermined constant drop across the fuel valve.

25. In a metering device for supplying fuel to an engine, a fuel flow passage having a metering orifice therein, a fuel valve upstream of said orifice, that portion of the fuel flow passage between the valve and orifice constituting an unmetered fuel chamber, another fuel chamber upstream of said valve, means for supplying fuel under pressure to said latter chamber, a diaphragm connected to said valve and having one face thereof exposed to the pressure of fuel in said unmetered fuel chamber, means for exerting a force on said diaphragm in a valve opening direction varying with variations in engine speed to regulate the flow of fuel through said fuel flow passage, the pressure of fuel in the unmetered fuel chamber acting on the diaphragm to oppose said force, a by-pass chamber, a relief valve separating said by-pass chamber from said second-named chamber, a balancing chamber, a movable pressure responsive element connected to said relief valve, means communicating the balancing chamber with said unmetered fuel chamber to maintain a constant pressure difference between the balancing chamber and said second-named chamber, and resilient means urging said relief valve towards seated position against the pressure of fuel in said second-named chamber, said resilient means maintaining a constant drop across the fuel valve.

26. In a metering device for supplying fuel to an engine, a fuel flow passage having a metering orifice therein, a fuel valve upstream of said orifice, that portion of the fuel flow passage between the valve and orifice constituting an unmetered fuel chamber, another fuel chamber upstream of said valve, means for supplying fuel under pressure to said latter chamber, a diaphragm connected to said valve and having one face thereof exposed to the pressure of the fuel in said unmetered fuel chamber, means for exerting a force on said diaphragm in a valve opening direction varying with variations in engine speed to regulate the flow of fuel through said fuel flow passage, said force being opposed by the pressure of fuel in said unmetered fuel chamber, a by-pass chamber, a relief valve separating said by-pass chamber from said second-named chamber, a diaphragm connected to said relief valve, a balancing chamber, a conduit communicating the balancing chamber with said unmetered fuel chamber to maintain a constant pressure difference between the balancing chamber and said second-named chamber, resilient means urging said relief valve toward seated position against the pressure of fuel in said second-named chamber, said resilient means creating a constant drop across the fuel valve, a fuel cut-off valve in said flow passage downstream of said metering orifice, and means operatively connecting said cut-off valve with said conduit whereby when the fuel cut-off valve is turned to closed position communication is broken between the unmetered fuel chamber and said balancing chamber.

27. In a metering device for supplying fuel to an engine, a fuel flow passage having a metering orifice therein, a fuel valve upstream of said orifice, that portion of the fuel flow passage between the valve and orifice constituting an unmetered fuel chamber, another fuel chamber upstream of said valve, said valve having a stem portion projecting into said latter chamber, a thrust bearing mounted on said stem, means for supplying fuel under pressure to said second-named chamber including a pump rotor, a centrifugal governor in said second-named chamber having governor weights and coacting lever arms engaging the thrust bearing on said valve stem, a diaphragm forming a movable outer wall of the unmetered fuel chamber, a flexible connection between the diaphragm and valve, a bushing having a body portion projecting into the pressure chamber and slidably mounting said valve, means on the inner extremity of said valve stem for adjusting the effective position of said thrust bearing with respect to said governor weights, and a detachable drive connection between the pump rotor and said governor.

28. In a metering device for supplying fuel to an engine having an air intake passage terminating in an intake manifold, a fuel flow passage having a metering orifice therein, a needle controlling said orifice, and means for controlling said needle, said means comprising a housing defining a manifold pressure chamber, a spring loaded evacuated bellows mounted in said chamber and having a movable end connected to said needle, a supplemental bellows having a movable end connected to the opposite end of said first-named bellows and a fixed end anchored to said housing, said supplemental bellows being vented to a pressure constituting an

Certificate of Correction

Patent No. 2,531,780 November 28, 1950

FRANK C. MOCK

It is hereby certified that error appears in the printed specification of the above numbered patent requiring correction as follows:

Column 2, line 15, for the word "essential" read *sectional*; line 26, for "Figs." read *Figure*; line 35, strike out "and"; column 6, line 6, for "witht" read *with*; column 16, line 37, for "Figures 1 and 1" read *Figures 1 and 1a*; column 24, line 37, after "flow" insert *of*; column 26, line 49, for "controlling" read *controlled*; column 30, line 65, for "changing" read *charging*;

and that the said Letters Patent should be read as corrected above, so that the same may conform to the record of the case in the Patent Office.

Signed and sealed this 17th day of April, A. D. 1951.

[SEAL]

THOMAS F. MURPHY,
*Assistant Commissioner of Patents.*

Certificate of Correction

Patent No. 2,531,780                          November 28, 1950

FRANK C. MOCK

It is hereby certified that error appears in the printed specification of the above numbered patent requiring correction as follows:

Column 2, line 15, for the word "essential" read *sectional*; line 26, for "Figs." read *Figure*; line 35, strike out "and"; column 6, line 6, for "witht" read *with*; column 16, line 37, for "Figures 1 and 1" read *Figures 1 and 1a*; column 24, line 37, after "flow" insert *of*; column 26, line 49, for "controlling" read *controlled*; column 30, line 65, for "changing" read *charging*;

and that the said Letters Patent should be read as corrected above, so that the same may conform to the record of the case in the Patent Office.

Signed and sealed this 17th day of April, A. D. 1951.

[SEAL]

THOMAS F. MURPHY,
*Assistant Commissioner of Patents.*